US008622726B2

(12) United States Patent
Fitzpatrick

(10) Patent No.: US 8,622,726 B2
(45) Date of Patent: *Jan. 7, 2014

(54) INJECTION MOLDING APPARATUS HAVING A ROTATIONALLY CONTROLLED SCREW AUGER

(75) Inventor: Richard Ernest Fitzpatrick, Berthoud, CO (US)

(73) Assignee: Koalesce, Inc., Colorado Springs, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 13/454,307

(22) Filed: Apr. 24, 2012

(65) Prior Publication Data

US 2013/0108730 A1 May 2, 2013

Related U.S. Application Data

(63) Continuation of application No. 13/031,367, filed on Feb. 21, 2011, now Pat. No. 8,163,208, which is a continuation of application No. 12/429,177, filed on Apr. 23, 2009, now Pat. No. 7,906,048.

(60) Provisional application No. 61/125,214, filed on Apr. 23, 2008.

(51) Int. Cl.
*B29C 45/77* (2006.01)

(52) U.S. Cl.
USPC ....... 425/145; 264/40.1; 264/328.1; 425/149; 425/587

(58) Field of Classification Search
USPC .............. 264/40.1, 328.1; 425/145, 149, 587
See application file for complete search history.

(56) References Cited

U.S. PATENT DOCUMENTS 2,680,880 A 6/1954 Corbett
3,118,184 A 1/1964 Swenson
(Continued)

FOREIGN PATENT DOCUMENTS

JP 60-199623 10/1985
WO WO 2006/042849 4/2006
(Continued)

OTHER PUBLICATIONS

Bozzelli, "Process Control for Injection Molding Machines: Strategy & Requirements to be an Internationally Competitive Molder", Proceedings of the 51st Annual Technical Conference of the Society of Plastics Engineers, 1996, pp. 1-6.

(Continued)

*Primary Examiner* — Tim Heitbrink
(74) *Attorney, Agent, or Firm* — Sheridan Ross P.C.

(57) ABSTRACT

A thermoplastic injection molding system and method of use is described for molding parts from heated plastics and other organic resins. The machine uses heat sources located along the barrel to heat the source material while an auger screw transports the source material in the barrel. This transport step does not shear the source material, nor does it use friction to produce the heat necessary to melt the source material. The material becomes substantially liquid or melted during the heating process, and the melted material is forced, by the auger screw, into a chamber whereupon a plunger, situated concentrically with the auger screw, injects the material from the chamber into a mold. Sensors located along the barrel and in the chamber ensure consistency between mold cycles. The controller dynamically adjusts the injection molding process to achieve more consistent and reliable molded parts.

3 Claims, 13 Drawing Sheets

(56) References Cited

U.S. PATENT DOCUMENTS

| | | | |
|---|---|---|---|
| 3,888,393 | A | 6/1975 | Drori |
| 4,678,420 | A * | 7/1987 | Inoue .................... 425/144 |
| 5,356,281 | A | 10/1994 | Katsuno et al. |
| 6,338,840 | B1 * | 1/2002 | Allan et al. ............ 425/149 |
| 7,122,146 | B2 | 10/2006 | Akopyan |
| 7,361,294 | B2 | 4/2008 | Pierick et al. |
| 7,717,698 | B2 | 5/2010 | Cosgun |
| 7,906,048 | B2 | 3/2011 | Fitzpatrick |
| 8,038,424 | B2 * | 10/2011 | Smith et al. ............ 425/144 |
| 8,163,208 | B2 | 4/2012 | Fitzpatrick |
| 2002/0020943 | A1 | 2/2002 | Leopold et al. |
| 2003/0021860 | A1 | 1/2003 | Clock et al. |
| 2006/0134264 | A1 | 6/2006 | Hahn |
| 2006/0197254 | A1 | 9/2006 | Onishi |
| 2007/0104822 | A1 | 5/2007 | Okabe |
| 2007/0141188 | A1 | 6/2007 | Kim |
| 2007/0235901 | A1 | 10/2007 | Akopyan |
| 2008/0217815 | A1 | 9/2008 | Akopyan |
| 2009/0045538 | A1 | 2/2009 | Craig et al. |
| 2009/0057938 | A1 | 3/2009 | Zhang |

FOREIGN PATENT DOCUMENTS

| | | |
|---|---|---|
| WO | WO 2009/021315 | 2/2009 |
| WO | WO 2009/026673 | 3/2009 |

OTHER PUBLICATIONS

Collins, "Monitoring Cavity Pressure Perfects Injection Molding", Assembly Automation, 1999, vol. 19, No. 3, pp. 197-202 http://www.emeraldinsight.com/Insight/viewContentItem.do?contentType=Article&hdAction=lnkpdf&contentId=874804.

Goodship, V., ed., "Troubleshooting Injection Moulding," RAPRA Review Reports, 2004, vol. 15, No. 4.

Kapoor, et al., "Consistency of Multi Cavity Melt Control Injection Molding in a Commercial Application", International Journal of Polymer Processing, 1998, vol. 13, No. 4, pp. 398-402.

Kazmer, et al., "The process capability of multi-cavity pressure control for the injection molding process", Polymer Engineering and Science, Apr. 8, 2004, vol. 37, No. 11, pp. 1880-1895, Abstract available at http://www3.interscience.wiley.com/journal/108063992/abstract?CRETRY=1&SRETRY=0, accessed on Jul. 16, 2009.

Sherbelis, et al., "The Methods and Benefits of Establishing a Process Window", written on behalf of Moldflow Pty, Ltd., 1997, available at http://kazmer.uml.edu/Staff/Archive/1997ANTEC_Process_Window.pdf, pp. 1-10.

Linehan, "A Short Tutorial on Cavity Pressure Transducer Usage", written on behalf of D-M-E Company, Jun. 22, 1993, available at http://www.dme.net/wwwdme/tech/Pressure_Tutorial_2.pdf, pp. 1-5.

Sloan, "A New Machine Segregates Injection and Extrusion", IMM, May 2003, available at http://www.rdray.com/icu/icu.htm, pp. 1-5, printed on Jul. 17, 2009.

International Search Report for International (PCT) Application No. PCT/US09/41594, mailed Jun. 11, 2009.

Written Opinion for International (PCT) Application No. PCT/US09/41594, mailed Jun. 11, 2009.

Official Action for U.S. Appl. No. 12/429,177, mailed May 20, 2010 6 pages.

Notice of Allowance for U.S. Appl. No. 12/429,177, mailed Nov. 5, 2010 5 pages.

Notice of Allowance for U.S. Appl. No. 13/031,367, mailed Dec. 20, 2011 7 pages.

* cited by examiner

INJECTION MOLDING APPARATUS HAVING A ROTATIONALLY CONTROLLED SCREW AUGER

CROSS REFERENCE TO RELATED APPLICATIONS

The present application is a continuation application of application Ser. No. 13/031,367, filed Feb. 21, 2011, which is a continuation of application Ser. No. 12/429,177, filed Apr. 23, 2009 (now U.S. Pat. No. 7,906,048) and claims the benefit of U.S. Provisional Patent Application No. 61/125,214 filed on Apr. 23, 2008; the entire disclosures of which are hereby fully incorporated by reference as part of the present application.

FIELD OF THE INVENTION

The present invention relates generally to thermoplastic molding methods and apparatus, and more particularly pertains to methods and apparatus for injection molding thermoplastic.

BACKGROUND

Injection molding machines are expensive to purchase, require expensive factory space and substantial quantities of electrical power. Additionally, set-up and operation of injection molding machines is a highly subjective trade, wherein there are significant set-up charges each time a tool is set. Starts and stops of such machines can be very expensive and there are always technicians and/or operators directly involved in such activities. The general practice on start up of an injection molding machine is provide an initial machine configuration (e.g., screw rotation rate, operable screw barrel temperature, injection pressure, etc.), then a "purging" process is performed where an operator first confirms that the injection molding machine is not connected to a mold, and then commences to process plastic but discarding the resulting plastic melt until the operator judges that the output plastic looks hot enough and appears to be of a low enough viscosity to commence molding test parts. Subsequently, a plurality of test parts are produced for inspection and/or analysis to thereby determine whether the machine is configured appropriately to successfully produce parts having the intended characteristics (e.g., fully conforming to the intended part shape, density, elasticity, etc.). Accordingly, the machine settings are generally fixed for mass producing the part.

The above described injection molding practice has substantial problems in that various part affecting parameters can change during the part mass production. For example, the operator settings may not be adequate for keeping the injection machine in a state for maintaining part consistency. In particular, it may not be possible to adequately determine whether the plastic is sufficiently uniformly heated so that acceptable parts can be produced therefrom. Additionally, since patches of plastic raw material inherently vary in their composition, variation in part production may be necessary dependent upon variation in the plastic raw material. Furthermore, the various injection molding parameters (whether settable by an operator or not) are generally interrelated with respect to producing acceptable parts. For instance, (a) nozzle injection pressure and plastic flow rate are inversely related, (b) plastic flow rate and plastic temperature are generally directly related, and (c) changes in screw rotation may generally be directly related to plastic temperature, although such may depend on the degree to which plastic heating is performed by shearing of the plastic in the screw barrel. Accordingly, it is very difficult to effectively and consistently configure a conventional injection molding machine to produce acceptable quality parts, and for very small quantities of parts the overhead for configuring such a machine can unacceptably expensive.

Accordingly, it would be advantageous to have an injection molding system and method of operation that is substantially more cost effective to manufacture and operate. Additionally, it is desirable for such a system and method to be less dependent upon operator trial and error to configure such systems for consistently producing acceptable quality parts.

SUMMARY

A thermoplastic injection molding system and method of use is disclosed for molding parts from heated plastics and other organic resins, wherein the system includes an injection molding machine and a controller for controlling the machine such that when the controller is supplied with input from various machine sensors providing real time measurements related to the characteristics of the plastic or resin (collectively referred to a "plastic" hereinbelow) in the injection molding machine, the controller dynamically adjusts the injection molding process to achieve more consistent and reliable molded parts.

The injection molding machine disclosed herein includes a screw for transporting the solid unmolded plastic material (e.g., pellets) from a storage container or hopper to an injection zone or chamber for collecting melted plastic in preparation for injecting the melted plastic therein into mold. The screw is configured within a barrel or cylinder in a manner that substantially prevents the plastic being conveyed therein from being sheared, and in particular, prevents such shearing between the barrel and the screw. Accordingly, the rotation of the screw when conveying plastic requires substantially less torque than prior art injection molding machines having a screw that shears the plastic. In particular, the tolerances and configuration of the screw within the barrel are such that the gaps between the inside diameter of the barrel and the outside diameter of the screw are small enough so that the plastic pellets cannot be sheared therebetween. Moreover, the barrel (and plastic therein) is heated, insufficient heat is applied to allow the plastic to deform into such gaps and be sheared, and insufficient heat is applied to induce the plastic to adhere to the screw flutes or the inside of the barrel for substantially an entire length of the screw. Thus the present injection molding machine uses substantially less energy to rotate the screw. Furthermore, the screw can be easily removed from the barrel since both the screw and barrel are substantially free of adhered to plastic.

Due to the screw being primarily a conveyance mechanism for the plastic pellets, the screw can be designed for efficient and effective conveyance rather than for shearing. Moreover, a result of such a screw design in the present injection molding machine is that the pellets compact within the barrel as they travel toward and ultimately enter plastic melting zones of the present injection machine. Such compaction has a particular advantage of effectively providing a barrier for preventing melted plastic from leaking or flow backward in the injection molding machine. Accordingly, a valve for preventing such flow back is unnecessary. However, in the event that such compaction is diminished enough so that there is plastic melt flow back, there may be one or more thermocouples or other heat sensors for detecting an inappropriate increase in heat, and providing such information to the controller (e.g., a computer system specifically configured for controlling the production of parts by the present injection molding machine, and/or programmable logic controller), wherein one or more of the following may be initiated by the controller: an operator may be alerted, the screw rotation rate at least temporarily increased, shutting down the mold injection machine (e.g., in the event that there are insufficient plastic pellets in the hopper), activating a pellet jam breaking mechanism for jams in the hopper, and/or activating a mechanism for automatically feeding additional pellets to the hopper.

The hereinabove described screw and a corresponding extent of the barrel may be considered as a first zone of the injection molding machine, wherein there is a series linearly aligned injection molding machine zones for transforming the plastic into a melt acceptable to mold parts. At the end of this first zone (e.g., substantially where the plastic pellets compact), a second zone commences wherein one or more heat sources (controlled by the controller) are active for heating the plastic within this zone so that the plastic becomes flowable. In general, the increase in heat over that of the first zone may be only a few degrees above the heat applied in the first zone (e.g., an increase in temperature in a range of 25-250° F.). The heat sources may be one or more of a resistance, inductance or ultrasonic heat source. These heat sources are positioned and arranged so that the heat generated affects the plastic, within a relatively short portion of the screw, and substantially at the termination of the screw flutes, so that the plastic becomes flowable. More specifically, the plastic becomes sufficiently flowable (due to pressure of additional upstream plastic moving into this second zone) to flow downstream through heating channels of a third zone described hereinbelow. Since most plastics do not conduct heat well, the second zone (also known as the "transition zone" herein) may be configured so that there is an increase in heated surface area for contacting the plastic within this second zone. In one embodiment, such an increase in heated surface area may be at least partially due to a heated annular interior barrel wall that serves as an intermediary barrel portion for connecting the barrel interior of the first zone to the downstream third zone having a barrel interior of reduced cross sectional dimension. In particular, the portion of the barrel extent for the first zone may have a first diameter in a range of, e.g., 2 inches to 10 inches, and the interior dimension of the third zone may have a diameter in a range of, e.g., 40% to 60% less. Such a heated wall provides a substantial increase in surface area for transmitting heat to the adjacent plastic. Moreover, such a wall can be configured to be substantially perpendicular to the general helical path of the plastic to thereby induce a buildup of plastic (and corresponding pressure which may be in a range of 100-5000 psi (pounds per square inch)) adjacent to and in contact with this wall for facilitating heat transfer to the plastic. Additionally, the terminal end of the screw within the second zone may terminate in a substantially convex shape (e.g., a truncated conical surface which forces the plastic closer the heated wall). In one embodiment, this terminal end of the screw may also radiate heat via, e.g., one of the heat sources identified hereinabove.

It is worthwhile to note that since sufficient heat to induce adherence of the plastic to internal machine surfaces only commences in the second zone, and since this zone is of short length (relative to the screw length and the length of the machine) any plastic that adheres to the internal machine surfaces in this second zone (e.g., due to a machine shutdown or heat interruption) will not be so substantial that the screw cannot be readily extracted from the barrel. In particular, the linear extent of the total barrel residing in the second zone may be only 2% to 10% of the length of the screw, and there may be few (if any) screw portions (e.g., attenuated screw flutes) in this second zone where there could be a sufficient buildup of resolidified plastic that would substantially inhibit the screw from being extracted without damaging some portion of the machine or without disassembling the barrel screw combination from the remainder of the machine.

In the third zone following the second or transitional zone, the flowable plastic is forced by pressure buildup in the second zone, to flow through one or more (preferably a plurality of) channels of this zone, wherein such channels conduct the plastic through the length of this third zone, and into a fourth or injection zone described hereinbelow. The channels may be distributed circumferentially about an extension of the screw shaft, wherein in at least one embodiment this extension includes an injection plunger that reciprocates along the rotational axis of the screw for repeatedly injecting melted plastic into a mold. Each channel may extend parallelly to the shaft axis between a receiving opening for receiving plastic, and an exit opening from which the plastic exits. The third zone is also heated by one or more of the heat sources for continuing to elevate the temperature of the plastic provided therein. Moreover, since the channel(s) may substantially increase the heated barrel surface area in contact with the plastic, the plastic in the channel(s) liquefies, or substantially reduces its viscosity so that it may flow into the injection zone (when not prevented) at a rate in direct proportion to the number of screw rotations realized within the system. The temperature increase in the plastic due the heat imparted via the channel(s) may be in a range of 25-250° F. Note that the heat sources for this third zone may be external to the portion of the barrel for the third zone, embedded within the barrel, and/or provided by the extension to the screw shaft (such extension may have a length of, e.g., 1.5 inches to 12 inches depending on the size and plastic processing capacity of the present injection mold machine).

In at least some embodiments, the shaft extension extends (along the axial length of the barrel) substantially the entire length of the third zone. However, when the plunger is fully retracted into the screw shaft, the exit opening(s) of the channel(s) opens into the injection zone so that melted plastic can exit the channel(s) and into this injection zone. Thus, since the melted plastic is typically under pressure (e.g., a range of 100-1000 psi) in the channel(s), and there is a reduced pressure in the injection zone (e.g., ambient atmospheric pressure), plastic will flow out of the channels and into the injection zone whenever such a pressure differential exists. However, when the plunger extends into the injection zone for forcing plastic into a mold, such extension closes the channel exit opening(s) so that there is substantially no backwards flow of plastic from the injection zone into the channel(s) due to the plunger induced pressure increase in the injection zone. Accordingly, the plunger serves a dual purpose of both forcing melted plastic into the mold, and also iteratively opening and closing the channels to the injection zone. So, in particular, the present injection mold machine requires no separate valve for metering the plastic melt into the injection zone.

The fourth or injection zone (also identified as a "plastication zone") includes an injection chamber for receiving plastic from the channels, and an injection tube through which plastic flows from the injection chamber to an injection nozzle which is attached to the mold for providing plastic therein. As with other plastic conveying portions of the present injection molding machine, the injection chamber and the injection tube are connected so that the melted plastic flows generally in a straight path along the axis of the barrel. Thus, this linear arrangement prevents plastic pressure drops which can occur where the pressurized liquid plastic is constrained to abruptly flow in substantially different directions (e.g., around a 90 degree corner).

The injection zone also includes one or more of the heat sources for providing additional heat to the plastic provided therein. As with the heat sources in the other zones, the heat sources for the injection zone are controlled by the controller (e.g., a computer system specifically configured for controlling the production of parts by the present injection molding machine, and/or programmable logic controller), It is worthwhile to note that in one embodiment of the present injection mold machine, a vacuum controlled break valve is provided for control of gas (e.g., air) entering the injection zone. In particular, the vacuum break valve allows air to enter the injection chamber when the injection plunger lowers the pressure within the fourth zone (in particular, the injection chamber) due to the plunger retracting from the injection chamber and into the screw shaft extension. In at least one embodiment, the vacuum break valve is provided along a shaft of the plunger, wherein this plunger shaft reciprocates into and out of the screw shaft. Accordingly, when a lower pressure (e.g., lower than ambient atmospheric pressure) occurs in the injection chamber, the vacuum break valve opens to introduce air into the injection chamber as will be described further hereinbelow. During plunger retraction (toward and/or into the screw shaft), the vacuum break valve remains open until (or just before) the plunger retracts sufficiently so that the channels are open to the injection chamber, and then the valve closes hereby preventing the melted plastic entering the chamber from exiting via the valve.

It is additionally worthwhile to note that when plastic is urged under pressure into the injection chamber, the heated gas (e.g., air) therein readily escapes as a backflow product through, e.g., the channel(s). Such gas backflow is facilitated in the present injection molding machine since the screw does not tightly fit within the barrel, and thus, gas can escape into the barrel (via the channel(s)) as plastic enters the injection chamber. Empirical evidence indicates that when the present injection molding machine is operating for molding acceptable parts, the pressure in the channels is effective for rapidly filling of the injection chamber with melted plastic. Accordingly, it is believed that the melted plastic enters the injection chamber at sufficient velocity to fill this chamber with melted plastic beginning with the opposite end of the chamber from the chamber end that repeatedly provides the plastic via the channel(s). Accordingly, since the exit opening for providing plastic from the injection chamber to the injection tube is located in this opposite end of the injection chamber, when the high velocity plastic commences to fill the chamber, it does so from the chamber opposite end. Consequently, the gas within the injection chamber is displaced from this opposite chamber end thereby substantially preventing gas pockets from being trapped within the plastic proximate exit opening. Moreover, since it is believed that the melted plastic collects within the chamber from this opposite end first, the gas within the chamber is forced to travel backward toward the channel opening(s) as the melted plastic under pressure injects into the injection chamber. In some embodiments, such channel opening(s) may be shaped to facilitate the melted plastic filling the injection chamber from the opposite end to the chamber end having the channel opening(s). In particular, such channel opening(s) may be shaped to direct the melted plastic into particular portions of the injection chamber. For example, the channel opening(s) may be shaped so that when the channel(s) initially opens, melted plastic is directed generally toward the interior of the opposite end of the chamber, and as the channel opening(s) widens, the melted plastic may be generally directed to a portion of the axial centerline of the plunger reciprocation wherein this portion is progressively closer to the channel opening(s). Accordingly, the gas backflow may be generally along or adjacent to the chamber sides providing relatively direct backflow paths to the channel opening(s).

Moreover, it is aspect of the present injection molding machine, that since such escaping gas is heated to substantially the temperature of the injection chamber, this gas may be reused to facilitate the heating of the plastic in the second and/or the third zones. Alternatively/additionally, such heated gas may also be recirculated back into the injection chamber via the vacuum break valve described above. Accordingly, the recycling/reuse of the heat within the escaping gas increases the efficiency of the present injection molding machine.

Further note that in one embodiment, there may be backflow vents separate from the above described channels, wherein such backflow vents do not conduct melted plastic into the injection chamber.

The injection tube of the fourth zone may be of reduced cross sectional area in comparison to the injection chamber, and additionally may be of sufficient length to contain at least one volume of plastic from the injection chamber, but generally less than two such volumes. Accordingly, since the injection tube has an increased surface area (relative to volume) in comparison to the injection chamber, and is also heated, the plastic therein is acceptably liquefied for mold injection. However, due to the relatively small volume of plastic therein, the energy consumption of the injection molding machine is reduced over similar prior art injection molding machines.

The fourth zone may also include a programmable nozzle valve at or proximate to the injection nozzle, wherein this valve opens to release melted plastic in a mold cavity when there is sufficient pressure within the injection nozzle.

It is an aspect of the present injection molding machine that the controller mentioned hereinabove receives various sensor readings indicative of plastic temperatures, plastic pressures, and plastic viscosity. In particular, the controller receives the following measurements from the injection molding machine:

(a) A pressure measurement from a screw pressure sensor at the end of the screw opposite the screw end terminating in the second zone. When the screw rotates to push the plastic pellets forward, there is a corresponding back pressure induced to push the screw in the opposite direction from the direction to pellets move. Such back pressure is related to the quantity of pellets being moved by the screw, and more importantly, the quantity of pellets being compacted in the second zone. Accordingly, unless a predetermined back pressure is sensed by the controller from the screw pressure sensor providing such pressure measurements, the activation of the plunger will not commence, or if already reciprocating, the plunger may cease to reciprocate until a threshold pressure is detected by the controller from the screw pressure sensor.

(b) A temperature sensor in the first zone for monitoring the temperature of the plastic pellets and/or the barrel in this zone. Accordingly, the controller controls the one or more first zone heating devices so that the pellets are heated just below their softening or deforming temperature in the first zone.

(c) A chamber pressure sensor for sensing pressure within the injection chamber. Unless there is at least a predetermined pressure within the injection chamber, the injection plunger will not be activated to send a plastic pressure wave into the injection tube and consequently cause melted plastic to be injected into a mold cavity. Accordingly, the present injection molding machine only forms parts when an appropriate pressure is registered by this pressure sensor.

(d) A tube temperature sensor located in the injection tube, at or proximate to the nozzle. Unless the plastic and/or the injection tube is determined to be of a threshold temperature (e.g., specific to the plastic), the plunger will not be activated, and the nozzle valve will not be opened to allow plastic to be injected into a mold cavity.

(e) A tube pressure sensor located in the injection tube, at or near the nozzle. Unless the plastic is determined to have a threshold pressure within the injection tube (such pressure obtained from the most recent injection(s) of plastic via the plunger), the nozzle valve will not be opened to allow plastic to be injected into a mold cavity. Accordingly, the plunger may be activated a plurality of times between openings of the nozzle valve or activated only with nozzle valve opening depending on the pressure requirements for the plastic within the injection tube. In some embodiments, the controller may use the tube pressure for determining a length of time the nozzle valve may be allowed to be open since the pressure on the melted plastic in combination known viscosity characteristics of the plastic at the tube temperature can be used to determine the amount of plastic that will be injected into a mold cavity.

It is a further aspect of the present injection molding system that it may achieve plastic and resin plastication through the conduction of electrically generated heat as opposed to pressure induced shear heat generation methods currently used by most injection molding machines. The conduction of electrically generated heat provides a process of plastication that is more accurate than shear generated heat. Additionally, since there is also a reduced pressure applied to the plastic (due to the lack or substantially reduced shearing), the injection molding machine may be used to mold parts from non-traditional materials (e.g., bio-based resins of any type, metal injection molding feedstock, and liquid silicone) that would degrade under shearing, and may be used to produce part with enhanced performance characteristics.

It is a further aspect of the present injection molding system and method of use that there may be continuous material plastication that preserves the plastic/resin quality with exact application of prescribed levels of heat to known volumes of plastic/resin. This method dramatically reduces the force and strength requirements for the subsequent injection process (via the plunger), thereby allowing a more accurate and responsive delivery of melted plastic/resin into an injection mold cavity.

It is a further aspect of the present injection molding system and method of use that integrated pressure and temperature sensors may be used by the controller to accurately quantify the output of the present injection molding machine, and in particular during the injection molding cycle for perfecting changes to the injection molding process in order to affect parts being produced. This is accomplished even when variations in the raw material are present. Moreover, such real time mold injection process changes are provided by an injection mold controller that is data-driven from measurements obtained from sensors provided in the injection molding machine. In particular, such a data-driven machine and method results in various components of the present injection molding machine having activations that are more asynchronous to one another than the lock step or a predetermined non-deviating sequence of steps prevalent in the prior art.

It is a further aspect of the present injection molding system and method that this system can initiated without an operator present (assuming the proper mold is connected to the injection molding machine, and this machine is appropriately clean). Moreover, the presently disclosed injection molding system and method can also operate unattended for molding parts. Thus, activation and operation of the present injection molding system may be performed automatically and remotely such as via a communications network (Internet) activation, wherein the present injection molding system and method remain unattended while producing the desired parts.

The above described aspects of the present injection mold system and method were combined at least in part due to the recognition of the longstanding unmet drawbacks in various prior art injection molding machines and methods. Moreover, even relatively recent supposedly improvements in plastic injection mold technology have substantial drawbacks. For example, the following recent references have been considered, and are incorporated herein by reference:

U.S. Patent Application Publication No. 2003/0021860 by Clock et. al. filed Jul. 24, 2001, wherein an injection molding apparatus is disclosed that includes: an extruder configured to receive and compound raw materials, a plunger disposed longitudinally within the extruder, and a mold positioned at the outlet end of the extruder and configured to receive the compounded raw materials. The extruder includes first and second screws intermeshed with each other along at least a portion of the length thereof. The plunger is typically positioned longitudinally within a bore defined within the first screw and is translatable within the bore. The method for using the apparatus includes adding at least one material to the extruding unit proximate a first end thereof, compounding the material, transporting the material to an outlet port proximate a second end of the extruding unit, and transferring the material from the outlet port to the mold via a reciprocating action of the plunger relative to the first screw. The Clock application discloses a check ring for preventing back flow of the liquid plastic out of an injection chamber. Such a check ring: can be unreliable, and introduce inaccuracies into the quantity of the plastic injected into a mold due to both the variability in the closing by the check ring as well as the restrictions to plastic flow therethrough. Note that such impedances to plastic flow are magnified in that such check rings are typically heat sinks; thus, causing the plastic to flow less readily. Moreover, it appears that the Clock's plunger (also a heat sink having sizable plastic contacting surface area) must rotate with the screw. Accordingly, since it is irregularly shaped (e.g., there are flutes therein), there is unnecessary drag on the motor rotating the screw. Additionally, since the check ring is not monitored during operation for determining if it is performing properly, there can be significant variability in parts produced, and for which machine configurations settable by the operator may have an unpredictable (if any) effect.

U.S. Patent Application Publication No. 2002/0020943 by Leopold et. al. filed May 9, 2001, wherein a molding machine is disclosed for molding microparts containing between 0.001 to 3.5 cubic centimeters of plastic shot volume includes a plasticizing portion operatively connected to an injection portion and a mold portion. A valve member is provided to open and close the connection between the plasticizing portion and the injection portion. A linear motor member is associated with the injection portion to permit molding times of presumably 0.01 seconds at pressures up to about 100,000 psi during injection of the molten plastic into the mold portion. Leopold discloses using a valve for apparently allowing melted plastic to flow into a bore for injection into a mold. Moreover, Leopold also needs an additional valve at his injection nozzle. There are reliability problems with such valves since a temperature decrease of the plastic in or around such valves can cause these valves to malfunction due to an increase in the viscosity or solidification of the plastic. Moreover, such valves are particularly problematic if the plastic includes one or more filler materials that may be fibrous since such valves may fail to fully close and/or open due to fiber build up or compaction in or around the valves.

Other features and benefits of the presently disclosed injection molding machine and method of use are disclosed in the accompanying figures, and the description hereinbelow. In particular, various novel aspects of the presently disclosed injection molding machine and method not described above may be described hereinbelow. Accordingly, this Summary section is intended to present a general overview of the present injection molding machine and method of use, but may not identify every patentable aspect thereof.

DETAILED DESCRIPTION OF THE INVENTION

Figure 1:
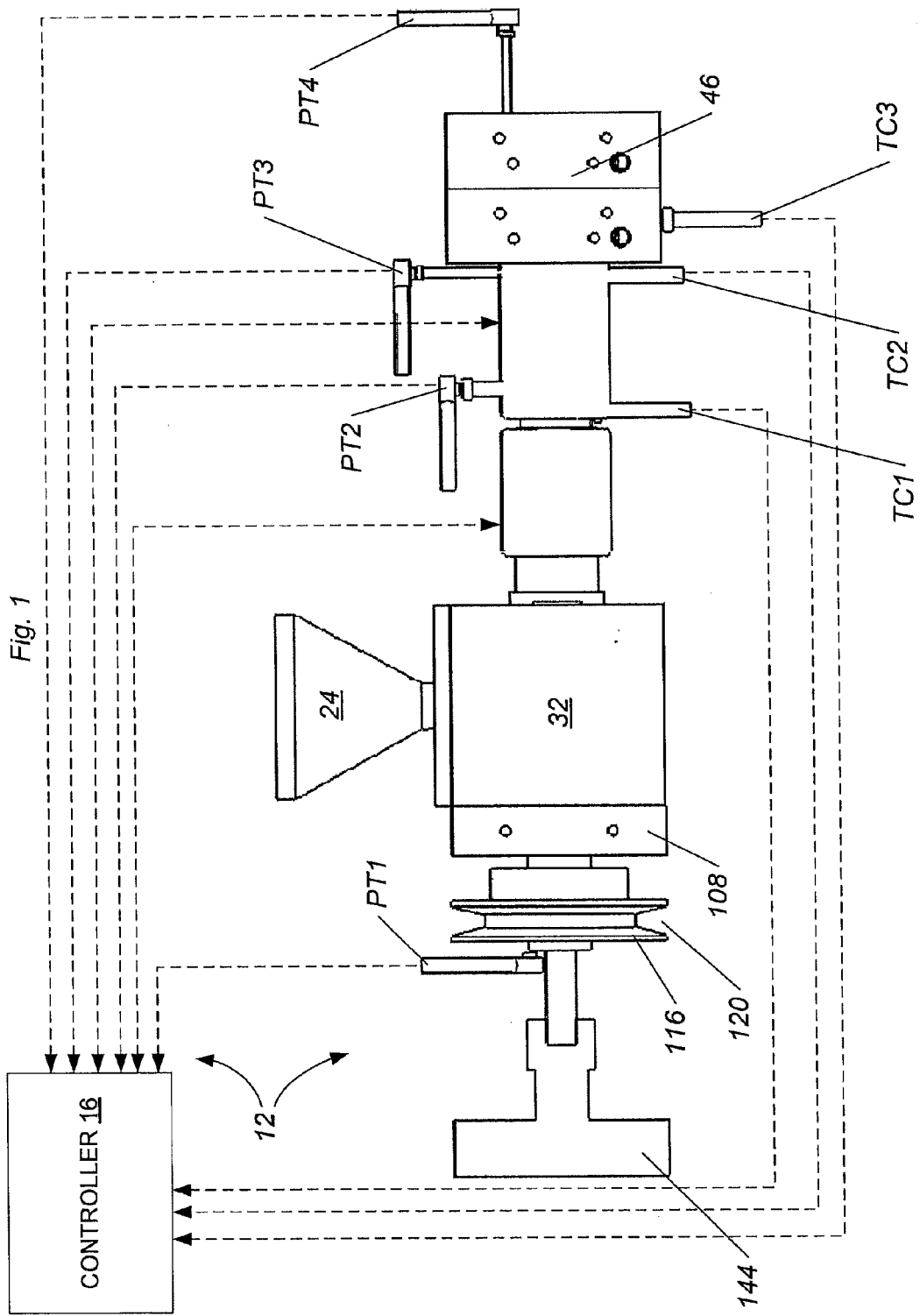
FIG. 1 is a side view of the machine showing the logical connections between the machine and the controller in one embodiment of the present disclosure.
Figure 2:
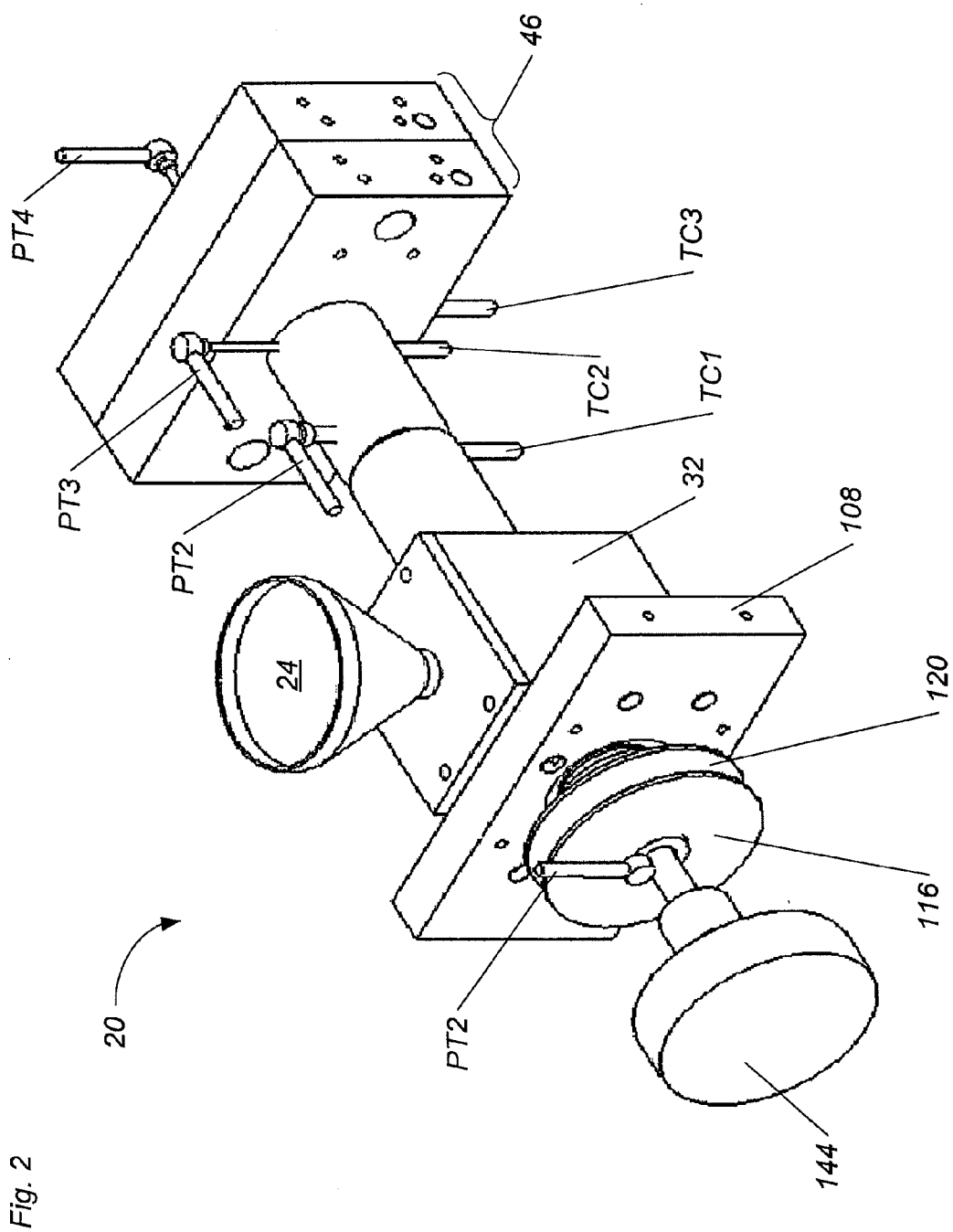
FIG. 2 is side elevation view of the machine.

In order to more fully appreciate the present invention, the following references are fully incorporated herein:

U.S. Pat. No. 7,122,146 by Akopyan, filed Apr. 18, 2005, wherein an injection molding machine utilizing microwave heating is disclosed. In particular, a microwave oven and a microwave absorbent plasticizing vessel therein, is utilized in an injection molding system to heat polymer granules to an injection temperature and injection of a resulting plastic melt into a cavity of an injection mold. The polymer granules may be preheated by conventional heating systems to a temperature at which the granules become microwave absorbent before heating to the injection temperature in the microwave oven. The injection molding machine also contains a hydraulic actuator for injection of the resulting plastic melt. The ceramic materials forming the plasticizing vessel are selected to provide equal heating rates of mold members and relatively uniform heating of polymer to desired injection temperature.

U.S. Pat. No. 7,361,294 by Pierick et. al. filed Feb. 2, 2005, wherein an injection molding system and method is disclosed for making microcellular foamed materials are provided as well as microcellular articles.

U.S. Patent Application Publication No. 2006/0197254 by Onishi filed May 2, 2006, wherein an induction-heating-type heating apparatus is attached to an area of the outer circumference of a heating cylinder adjacent to a cooling apparatus, whereby the temperature of the heating cylinder can be uniformly controlled to a proper value, and the temperature of the heating cylinder can be changed quickly. An injection apparatus is adapted to intermittently feed forward a resin within a heating cylinder by a screw in accordance with an injection molding cycle. The injection apparatus includes a cooling apparatus attached to a rear portion of the heating cylinder, and an induction heating apparatus attached to the heating cylinder to be located forward of the cooling apparatus and adjacent to the cooling apparatus.

U.S. Patent Application Publication No. 2007/0104822 by Okabe filed Jun. 23, 2006, wherein a plasticizing apparatus is disclosed for use with a resin material wherein the apparatus is reduced in size and wherein a plastication state of a resin material is presumably stabilized without raising a heating temperature for a plasticizing barrel. On the inner surface of a plasticizing barrel for plasticizing the resin material, one or more lines of a heat transfer pieces shaped like a ridge is/are disposed in a protrusion condition in a spiral or a straight line, and on the outer surface of the barrel, one or more lines of a heat receiving piece is/are disclosed.

U.S. Patent Application Publication No. 2009/0057938 by Zhang filed Aug. 28, 2007, wherein a method is provided for improving melt quality in an injection unit. A closed loop control system regulates operation of the injection unit in accordance with a reference value for at least one operating parameter. A sensor measures the present e1 value of a load upon the motor which drives an injection screw during operation of the injection unit. A processor compares the present value of the load to a reference value for the load. If the present value of the load deviates from the reference value of the load by more than a predetermined amount, then the processor may adjust the reference value of the at least one operating parameter. Operating parameters can include barrel temperature, back pressure and screw RPMs.

U.S. Patent Application Publication No. 2009/0045538 by Davina et. al. filed Aug. 13, 2007, wherein a method of controlling a screw in a two-stage injection unit and a system for implementing the method is disclosed. The method is executable at a computing apparatus associated with the two-stage injection unit. The method comprises receiving an indication of an operational parameter associated with the screw of the two-stage injection unit; based on the indication of the operational parameter, determining a target speed (STARGET) for the screw, the target speed (STARGET) being sufficient to enable the screw to produce a required amount of material in a molten state; causing the screw to rotate at the target speed (STARGET), thereby causing the screw to operate in a substantially continuous manner.

The above-identified references each have their own corresponding drawbacks that make them at most partially useful in addressing injection molding machine related problems.

An embodiment of the presently disclosed injection molding system 12 is shown in FIG. 1, wherein a controller 16 is shown together with the injection molding machine 20 that the controller 16 controls. The injection molding machine 20 will be first described hereinbelow, followed by a description of the controller 16.

Figure 3:
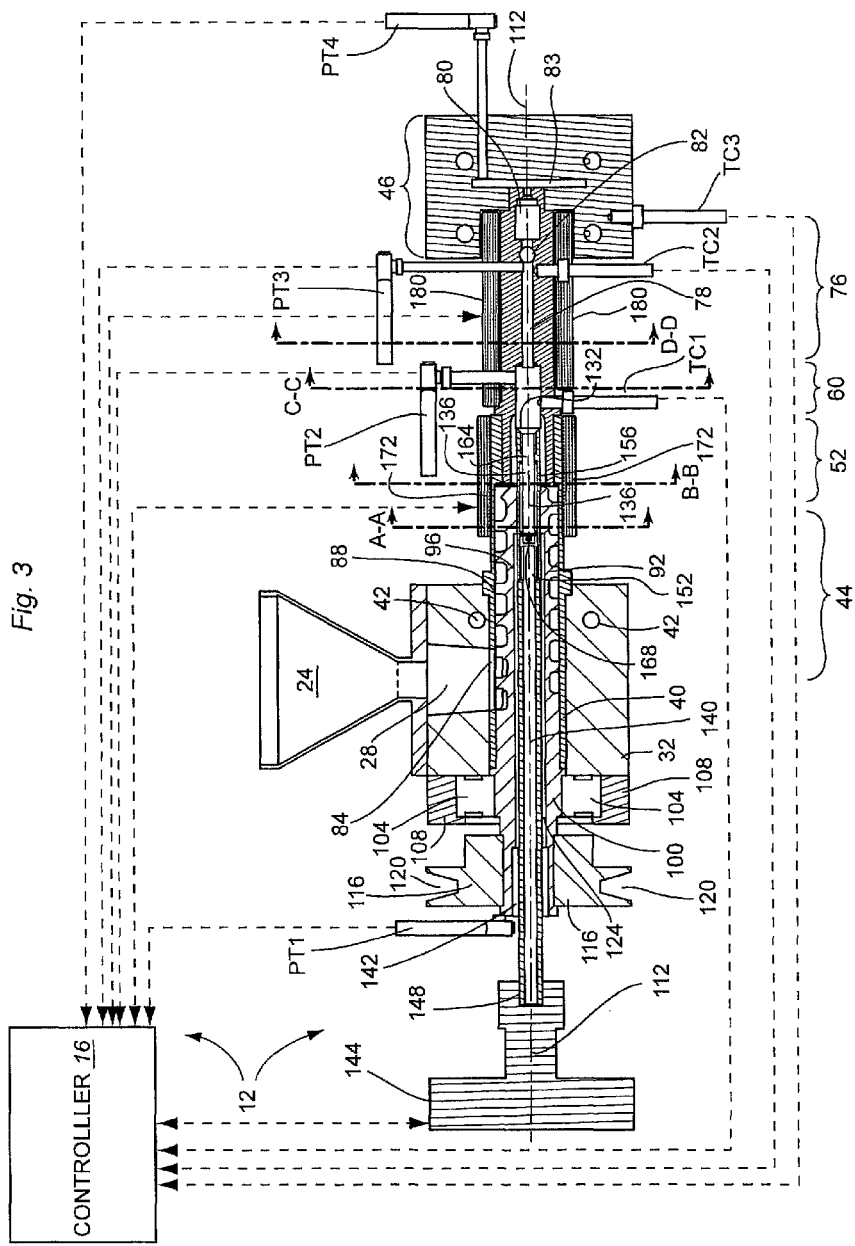
FIG. 3 is a cutaway side view of the machine showing the logical connections between the machine and the controller in one embodiment of the present disclosure.
Figure 4:
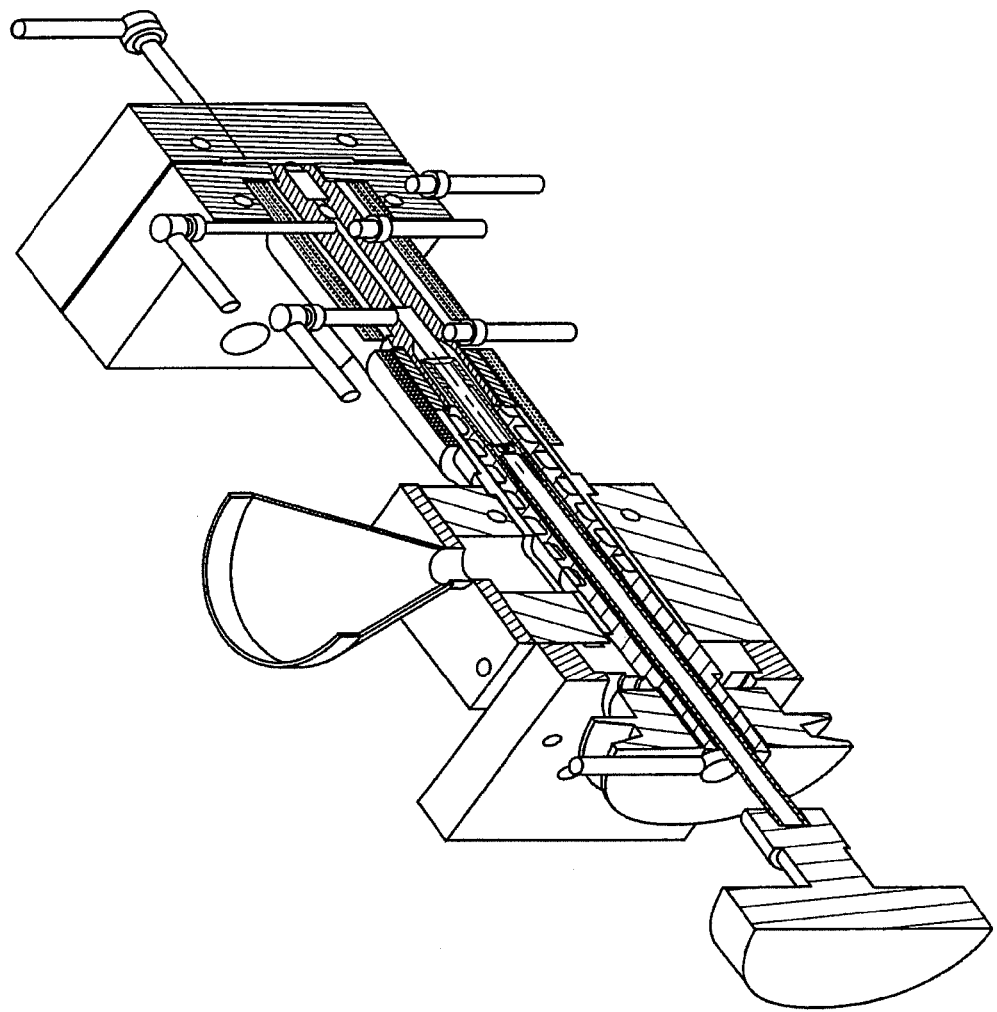
FIG. 4 is a cutaway side elevation view of the machine.
Figure 5:
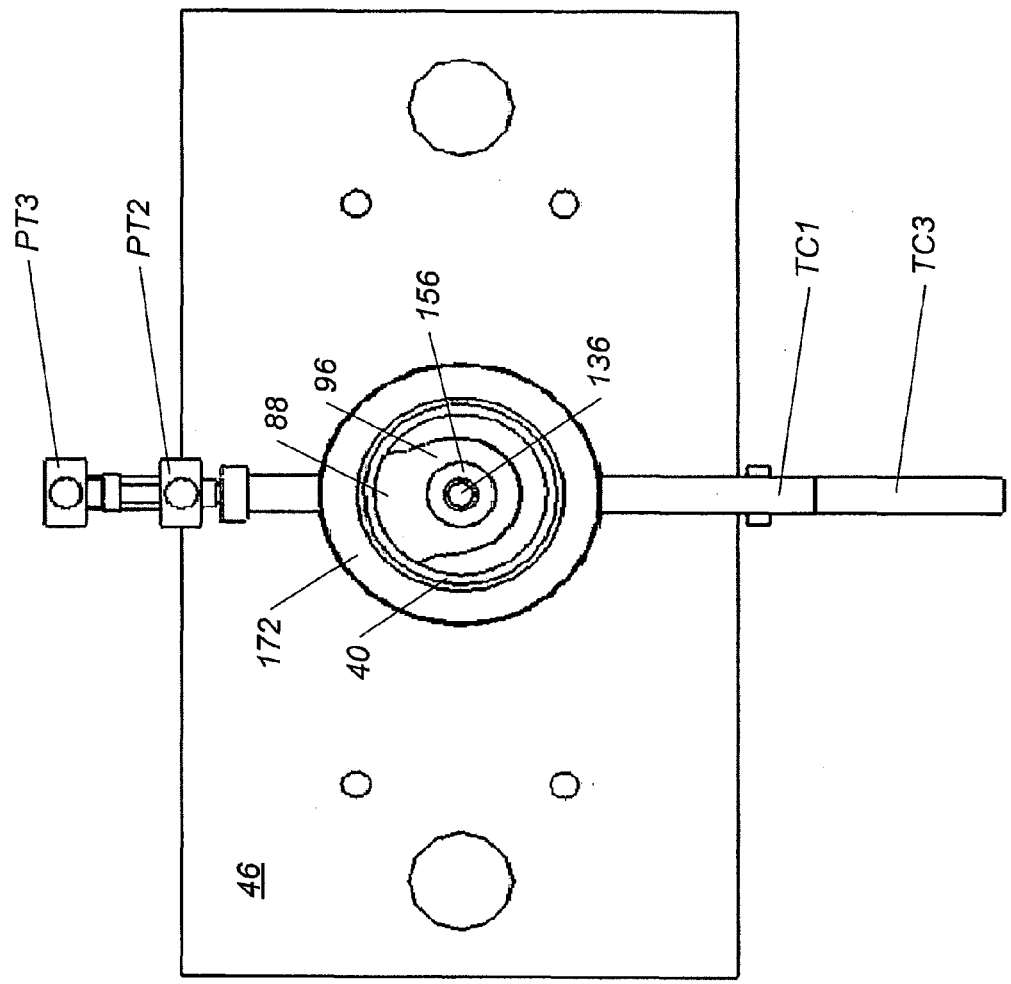
FIG. 5 is a cross-sectional view of the machine at a point indicated as A-A in FIG. 3, viewed from left to right with reference to FIG. 3.
Figure 6:
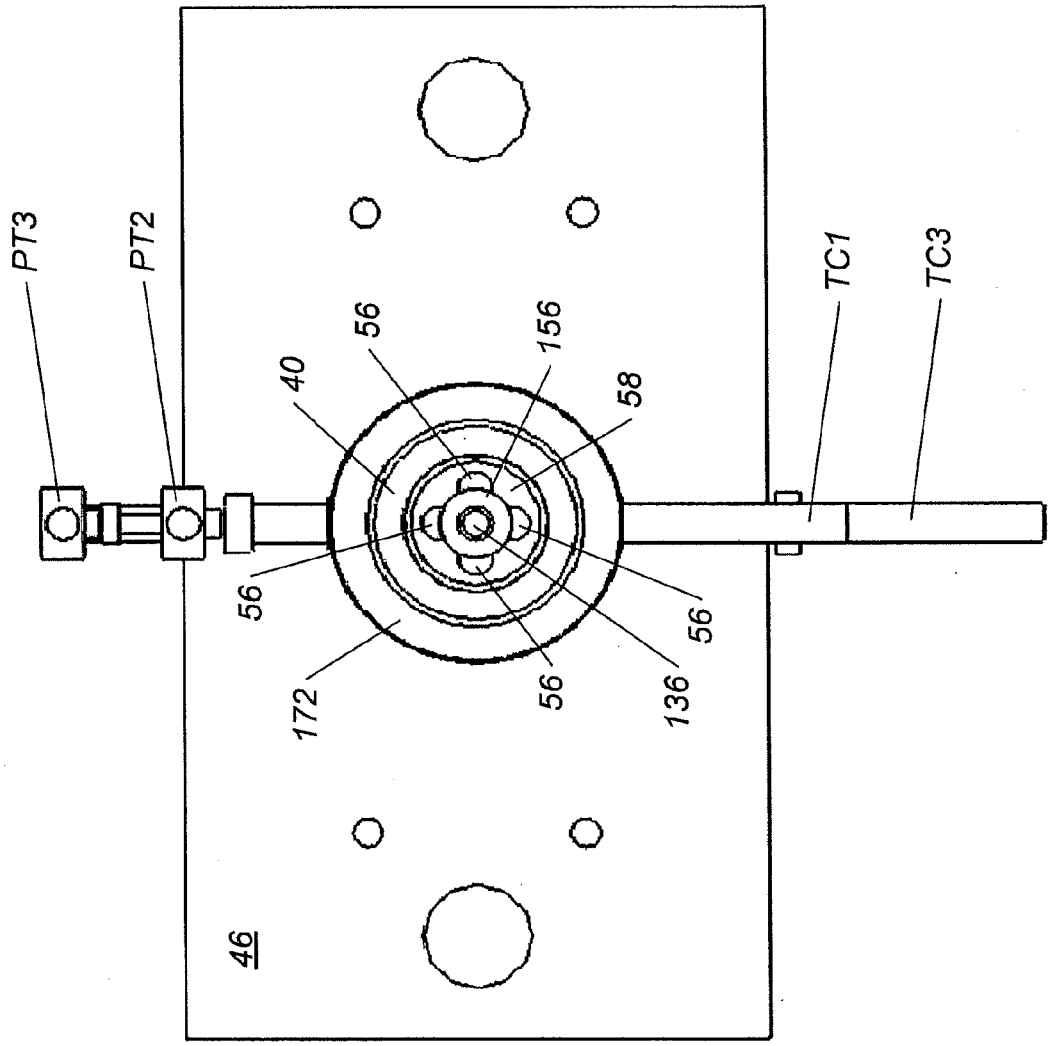
FIG. 6 is a cross-sectional view of the machine at a point indicated as B-B in FIG. 3, viewed from left to right with reference to FIG. 3.
Figure 7:
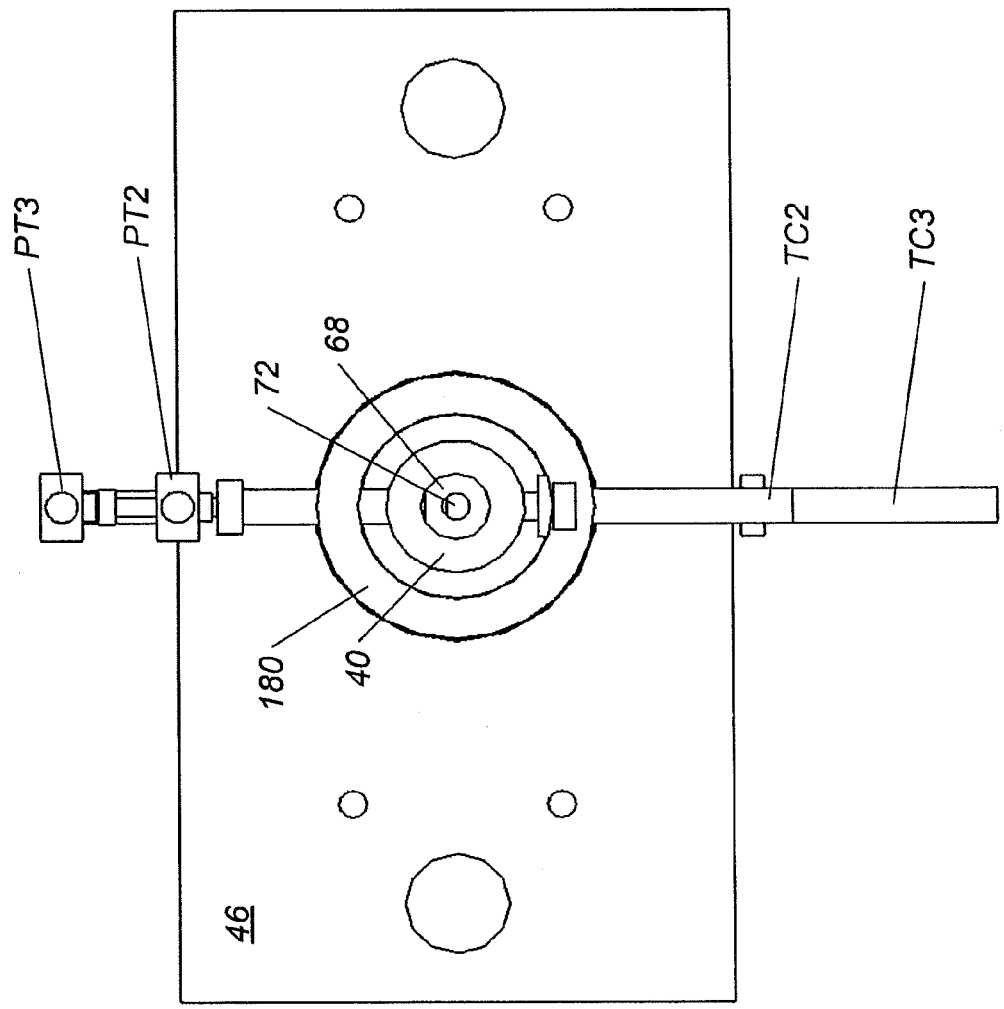
FIG. 7 is a cross-sectional view of the machine at a point indicated as C-C in FIG. 3, viewed from left to right with reference to FIG. 3.
Figure 8:
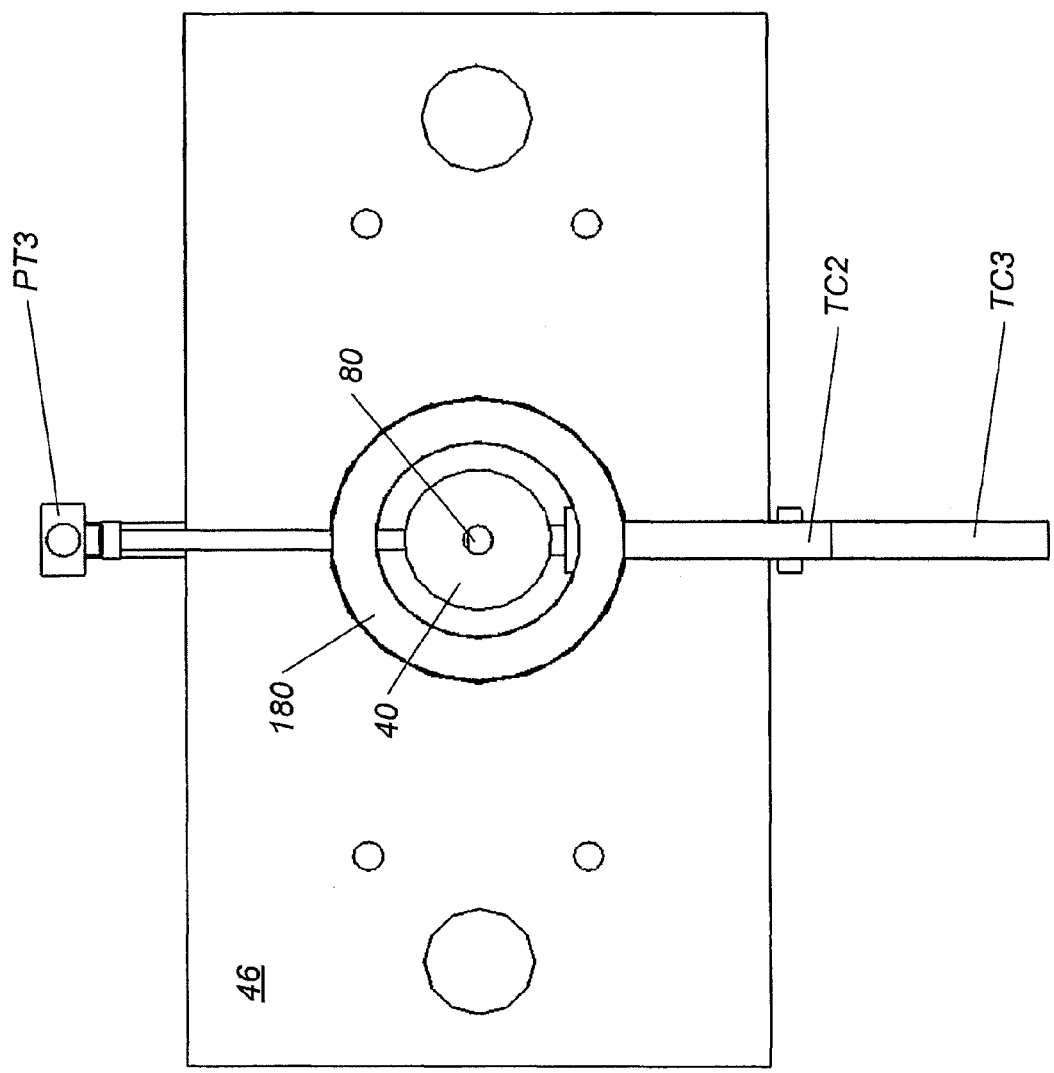
FIG. 8 is a cross-sectional view of the machine at a point indicated as D-D in FIG. 3, viewed from left to right with reference to FIG. 3.
Figure 9:
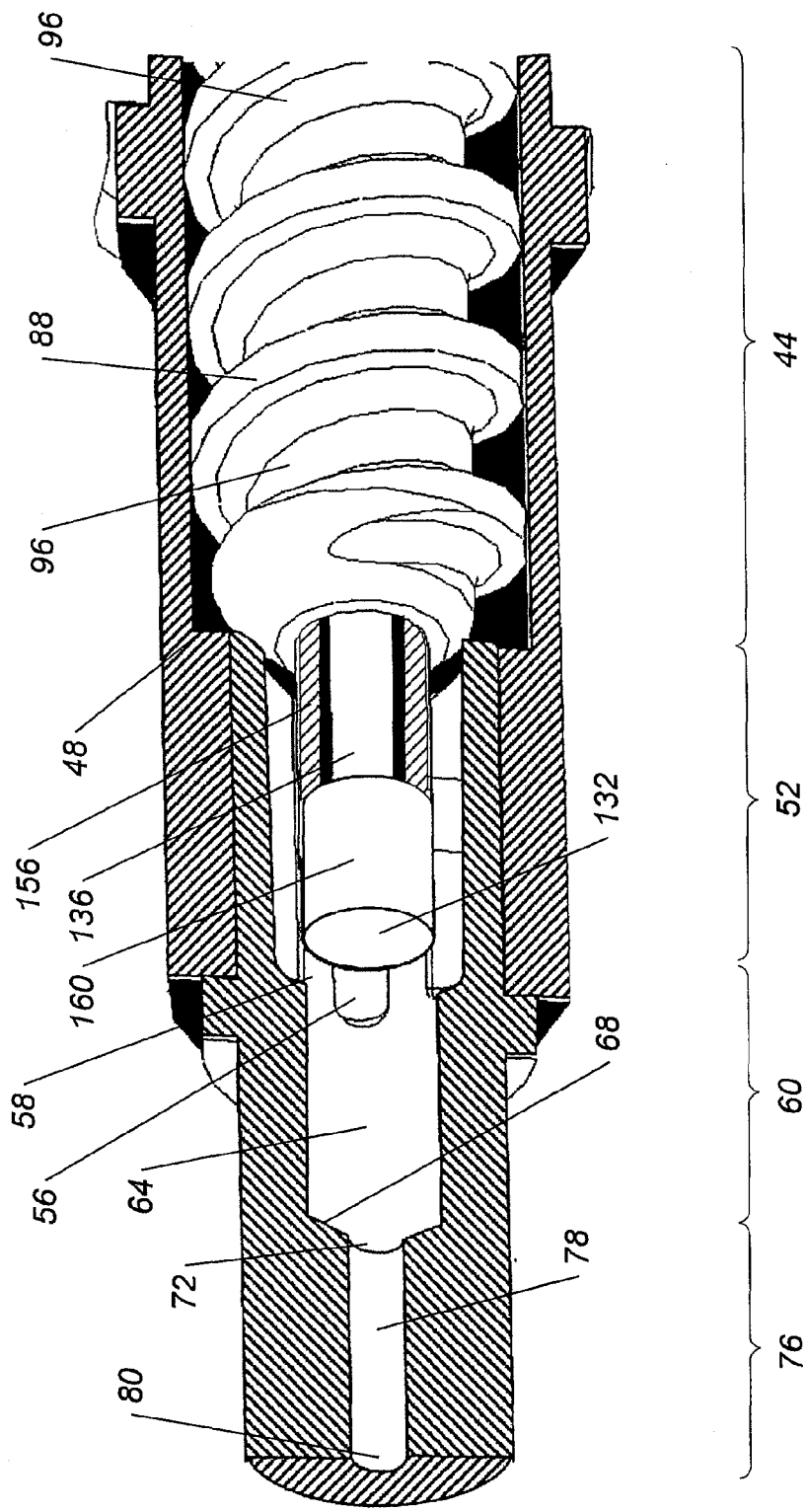
FIG. 9 is a detailed partial cutaway side elevation view of the machine.
Figure 10:
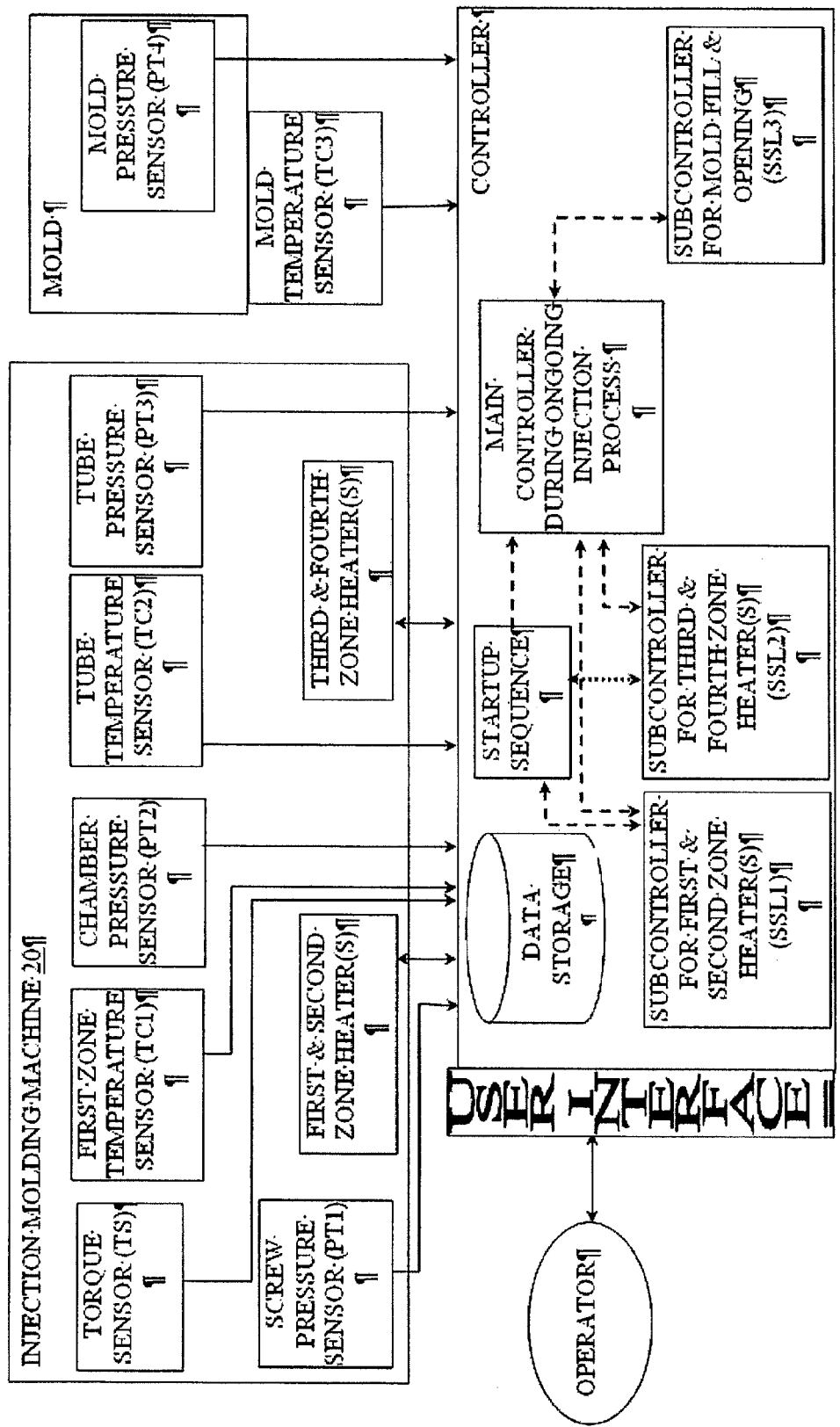
FIG. 10 is a block diagram showing components of the system 12, which includes machine 20 and controller 16 in one embodiment of the present disclosure.

In reference to FIGS. 3 and 4, a cross sectional view of an embodiment of the injection molding machine 20 is shown. The machine 20 includes a material hopper 24 for providing plastic material (e.g., plastic pellets) to the machine 20, wherein the pellets, by gravity, enter a substantially vertical escapement 28 below the hopper 24. The escapement 28 may be an opening in a throat block 32 which may be a metal block (e.g., cube or other shape) acceptable for providing support and stability to the material hopper 24 attached thereto as well as various components of the machine 20. In particular, the throat block 32 includes generally horizontal barrel opening 36 therethrough which intersects with the escapement 28. The barrel opening 36 is fitted with a barrel 40 that extends horizontally beyond the throat block 32 out one of the sides of throat block 32. The throat block 32 also includes a plurality of water channels 42 for circulating coolant (e.g., water or other suitable coolant) therein since, as will become evident from the description hereinbelow, excessive heat from the plastication of the pellets may transfer into throat block 32 and heat the pellets in the escapement 28 or the hopper 24 excessively (e.g., wherein the pellets might be soft). The barrel 40 provides the structural support within which the pellets are transformed into a suitable liquid state for injection into a mold 46. The barrel 40 includes a first stage 44 extending substantially through the throat block 32 and out of the throat block to the right in FIG. 3. This first stage 44 is coincident in extent (along the axis 112) with the first zone described in the Summary section hereinabove, and accordingly such an extent may be also referred to as the first zone 44. A cross section of the first stage 44 (in a direction traverse to the cross section shown in FIG. 3) is shown in FIG. 5. However, a cylindrical shape may be preferred. The first stage 44 may have a cylindrical interior extending therethrough. The first stage 44 terminates outside the throat block 32 at an interior annular wall 48 which reduces the interior of the barrel 40. From this annular wall 48 and extending further away from the throat block 32 is a second stage 52 of the barrel 40, this second stage being coincident in extent (along the axis 112) with the second zone described in the Summary section hereinabove, and accordingly such an extent may be also referred to as the second zone 52. This second stage 52 may have a generally cylindrical shaped interior which has center axis collinear with a center axis of the first stage 44. However, instead of having a smooth cylindrical interior surface as the first stage has, the second stage 52 includes a plurality of channels 56 in its interior side wall 58 (a representative cross section of the second stage 52 is shown in FIG. 6), wherein these channels extend outwardly from the center axis and such channels may be distributed about the circumference of the second stage. Since the channels 56 extend through the horizontal length of the second stage 52, the second stage terminates with channel openings at each end of the second stage. The end of the second stage distal from the first stage 44 is integral with a third stage 60 which has therein a cylindrical injection chamber 64 that may be of the same diameter as the second stage (excluding the channels 56), this third stage being coincident in extent (along the axis 112) with the third zone described in the Summary section hereinabove, and accordingly such an extent may be also referred to as the third zone 60. The injection chamber 64 has a horizontal center axis that is collinear with the center axes of the first and second stages 44 and 52. The injection chamber 64 extends away from the second stage 52 until a second diameter reducing annular interior wall 68 is reached, wherein a central opening 72 in the wall 68 (FIG. 9) may have a center point on the center axis of the injection chamber 64. From this second annular wall 68, a fourth stage 76 of the barrel 40 commences which includes an injection tube 78 that extends from an opening 72 in the second wall 68 to a nozzle end 80 of the machine 20, wherein the nozzle end is configured for attaching to the plastic injection mold 46 and injecting melted plastic therein as one skilled in the art will understand. Note that this fourth stage is coincident in extent (along the axis 112) with the fourth zone described in the Summary section hereinabove, and accordingly such an extent may be also referred to as the fourth zone 76. In comparison to the diameter of the injection chamber 64, the injection tube 78 includes a substantially reduced diameter cylindrical interior. Moreover, near or substantially at the nozzle end 80, there is a nozzle valve 82 which opens and closes under the direction of the controller 16. The nozzle valve 82 remains closed until a desired plastic consistency and pressure is detected within the injection tube 78. Once such conditions occur in the injection tube 78, and assuming the mold 46 is in a state wherein plastic can be accepted, the nozzle valve 82 is opened by the controller 16 for providing plastic to the mold cavity 83.

The barrel 40 also includes an opening 84 for receiving plastic pellets from the escapement 28. Such pellets enter the barrel 40 and are retained between the flights 88 of an auger screw 92 (also "screw" herein) provided within the barrel. The screw 92 is preferably concentric or coaxial with the barrel 40. The screw 92 includes a shaft 96 from which one or more helical flights 88 project outwardly therefrom, and such flights 88 extend from generally below the escapement 28 through the first stage 44 of the barrel 40. The shaft 96 also extends horizontally in the opposite direction from the escapement 28, wherein a thickened shaft portion 100 adjacent to the throat block 32 is secured thereabout with a bearing 104, which is provided within a mounting plate 108, which is fixedly attached to the adjacent side of the throat block 32. Accordingly, the bearing 104 supports and maintains alignment of the screw 92 within the barrel 40 so that the screw can rotate about a center axis 112 of the barrel, this center axis including the center axes for each of the first, second, third, and fourth stages of the barrel as described hereinabove. In particular, the screw 92 diameter within the barrel 40 is smaller than the interior diameter of the first stage by a tolerance of approximately 0.01 to 0.08 inches so that the screw can rotate freely within barrel when there is no plastic in the barrel to impede such free rotation. Note that the tolerance between the interior of the first stage 44 and the screw 92 may be dependent upon the intended size of the plastic pellets to be provided in the material hopper 24 since such tolerance is intended to be small enough so that such pellets cannot be caught and sheared between the interior surface of the first stage 44 and the portions (apexes) of the auger screw flights 88 that rotate closest to the first stage interior surface. Accordingly, the tolerance range above is believed appropriate for pellets that are approximately 0.125 inches in width, height and depth, pellets being a standard size for use in injection molding machines.

The shaft 96 also extends beyond the mounting plate 108, wherein a pulley 116 is also secured thereabout. For rotating the screw 92, a belt (not shown) is provided in the annular recess 120 of the pulley 116 and also provided about a pulley of a drive motor (also not shown) for rotating the pulley 116 and consequently the screw 92.

The screw 92 has a central bore 124 therethrough, the center axis of the bore is coincident with the center axis 112. Within the bore 124 there is an injection plunger 160 (having a plunger head 132 and a plunger shaft 136), and a plunger shank 140. The plunger shank 140 extends from the screw 92 rearward beyond the pulley 116. Prior to exiting the screw 92, the plunger shank 140 and the interior surface of the bore 124 are intermeshed via mating gear teeth 142 or another mechanism for both supporting the shank 140 within the bore 124, and for allowing the shank to shift along the center axis 112 under the urging of the motor (or pneumatic cylinder, hydraulic cylinder) 144 to which the shank end attaches via a bearing 148. In another embodiment, instead of mating gear teeth 142, a bearing that allows the shank 140 to move in the axial direction relative to the bore 124 and provide support for the shank 140 within the bore 124 may replace the mating gear teeth 142. Accordingly, the bearing 148 allows the shank 140 to rotate with the rotation of the screw 92 by the pulley 116. However, when activated (by the controller 16, also shown in FIGS. 1 and 3, and described hereinbelow) the motor 144 shifts the shank along the center axis 112 either for pushing the shank further into the screw, or for extending further rearward outside of the screw. In particular, the extent that the shank 140 may shift in either direction does not disengage the shank from the interior of the bore 124 at the shift mechanism 142. Moreover, length of such a shift (in either direction) may be identical to the travel of the plunger head 132 in the injection chamber 64 as will be further described hereinbelow. The shank 140 attaches, at a second end thereof opposite to the shank end attached to the motor 144, to a receptacle 152. In one embodiment, the receptacle 152 may be threaded and the second end of the shank 140 may have corresponding threads (e.g., male-female junction). In particular, the receptacle 152 may threadably mate with the end of the shank 140.

The sleeve 156 also projects beyond the fluted end of the screw 92. The portion of the sleeve 156 that extends beyond the end of the screw 92 is within a fine tolerance of the interior surface of the second stage 52 of the barrel 40. More precisely, the smallest interior diameter of the second stage interior side wall 58 may be within a tolerance of approximately 0.01 inches of the outer diameter of the sleeve 156. Thus, the sleeve 156 forms a rotatable inner most side of each channel 56 in the second stage 52. In the present embodiment, the exterior surface of the sleeve 156 forming the inner most channel sides may be highly polished or otherwise provided with a coating that substantially prevents melted or softened plastic from adhering thereto.

The sleeve 156 and the plunger head 132 are sealed together (such combination also referred to as plunger 160), and may be considered as an embodiment of the "shaft extension" referred in the Summary section hereinabove. An outside diameter of the sleeve 156 may be within a fine tolerance of the inside diameter of the injection chamber 64, e.g., within a range of 0.005 to 0.001, so that this sleeve 156 and plunger head 132 combination can enter the injection chamber (via an urging by the motor 144) for injecting melted plastic from the injection chamber into the injection tube 78, and also via an opposite urging by the motor 144, the plunger 160 can retract out of the injection chamber 64 once the plunger 160 reaches its full extension into the injection chamber 64.

Figure 3A:
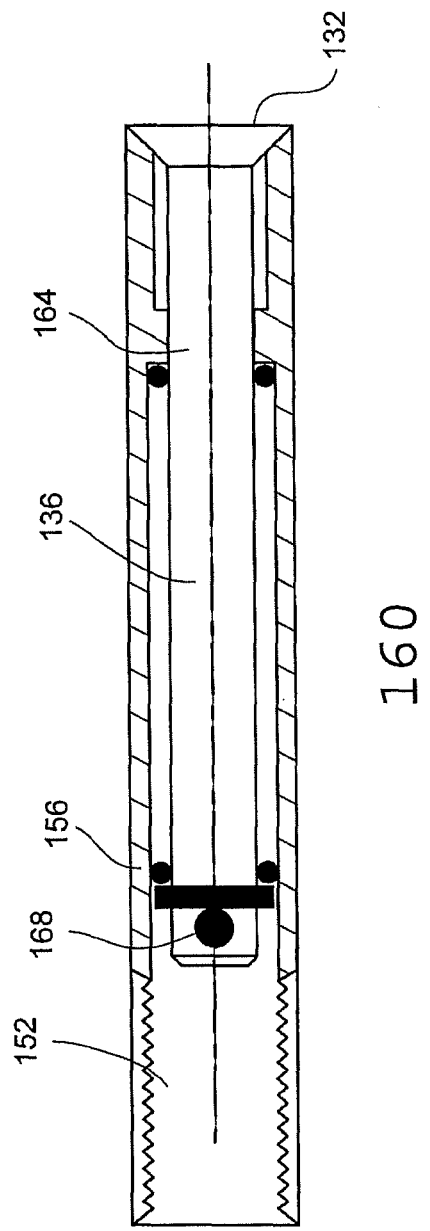
FIG. 3A is a detailed cutaway side view of portions of the plunger 160.

The plunger head 132 includes a one way vacuum break valve 164 (e.g., a poppet style valve) for opening and providing a gas (e.g., air) or other fluid substance therethrough when a reduced atmospheric pressure occurs in the injection chamber 64 relative to a pressure on an opposite side of this valve, and remaining closed otherwise. When the valve 164 opens, the gas provided to the injection chamber 64 comes, in one embodiment, from within the bore 124, and more particularly, from within a plunger vent 168 within the plunger shaft 136 (FIG. 3A). However, it is within the scope of the present disclosure that such gas may come from a backflow of gas (i.e., in an opposite direction from the flow of plastic toward the nozzle end 80) through the channels 56. The vacuum break valve 164 may be configured for opening when there is a pressure differential between sides of the valve in a range of 2 to 1,000 psi. Accordingly, when the plunger 160 retracts back into the screw 92, the vacuum break valve 164 opens so that the retraction of the plunger does not cause the melted plastic within the injection tube 78 to withdraw back into the injection chamber 64.

The injection molding machine 20 also includes a plurality of heat sources (e.g., such heat sources may generate heat via electrical resistance, electrical inductance, microwave or ultrasonic energy) distributed about and in contact with (or proximate to) various portions of the barrel 40. In particular, one or more such heat sources 172 may surround the barrel 40 in a later or terminal portion of the barrel first stage 44 near the commencement of the barrel second stage 52, and continue to surround barrel 44 in substantially the second stage 52. The heat sources 172 (under the control of the controller 16) preheat the plastic pellets to a point just below the softening point of the plastic.

The heat sources 172 (under the control of the controller 16) heat the plastic pellets therein to a temperature where they become at least soft and deformable for flowing into the channels 56 due to the pressure exerted on such deformable pellets from additional pellets moving into the second stage 52.

The steps performed by the controller 16 for appropriately activating and deactivating the heat sources 172 are described hereinbelow in the section entitled "Controller Operation". Note that in one embodiment, an additional heat source 176 (not shown in figures) may be placed on a different location of the barrel 44 and controlled by controller 16. Note that in such an embodiment of the controller 16 the heat sources 172 and 176 are activated and deactivated in unison by the same processing in the controller 16. That is, the controller may not distinguish between the heat sources 172 and 176. In another embodiment, heat sources 172 and 176 may be activated, for example, in a serial or sequential manner.

An additional one or more heat sources 180 may surround the barrel 40 in substantially its third stage 60 and fourth stage 76. The heat sources 180 (under the control of the controller 16) further heat the plastic in the injection chamber 64 and the injection tube 78 so that the temperature of the plastic is above a minimum threshold to be injected into the mold cavity 83. The steps performed by the controller 16 for appropriately activating and deactivating the heat sources 180 are also described hereinbelow in the section entitled "Controller Operation".

The injection molding machine 20 also includes a plurality of sensors for communicating measurements related to plastic processing to the controller 16. In one embodiment of the injection molding machine 20, there is a screw 92 pressure sensor (denoted "PT1" herein) attached, e.g., to the screw end between the pulley 116 and the motor 144, wherein this sensor measures the forces on the screw, wherein such forces are substantially along the center axis 112, and induced by the compaction of the plastic in first and second barrel stages 44 and 52. Accordingly, such for forces are in the direction for pushing the screw 92 out of the end of the barrel 40 provided in the throat block 32.

The injection molding machine 20 also includes a plurality of sensors for communicating measurements related to plastic processing to the controller 16. In one embodiment of the injection molding machine 20, there is a screw 92 pressure sensor or pressure transducer (denoted "PT1" herein) attached, e.g., to the screw 92 end between the pulley 116 and the motor 144, wherein this sensor measures the pressure on the screw, wherein such pressure is substantially along the center axis 112, and induced by the compaction of the plastic in first and second barrel stages 44 and 52. Accordingly, such for pressure may be considered a force in a direction for pushing the screw 92 out of the end of the barrel 40 provided in the throat block 32. A temperature sensor (denoted "TC1" herein) is attached to the barrel 40 (more particularly, the third stage thereof) for detecting temperatures in the injection chamber 64. The sensor TC1 may be a thermocouple as one skilled in the art will understand. Also attached to the barrel third stage is a pressure sensor or pressure transducer (denoted "PT2" herein) for measuring the pressure within the injection chamber 64. Downstream from the sensor PT2 is another pressure sensor or pressure transducer (denoted "PT3" herein), wherein this sensor measures the pressure within the injection tube 78. Additionally, there is a temperature sensor (denoted "TC2" herein) is attached to the barrel 40 (more particularly, the fourth stage thereof) for detecting temperatures in the injection chamber 64. The sensor TC2 may be a thermocouple as one skilled in the art will understand. Finally, there is a temperature sensor (e.g., a thermocouple) provided in the mold 46 for detecting temperatures therein. This last sensor identified as "TC3". Each of the above identified sensors provides their corresponding readings to the controller 16 as will be described in further detail hereinbelow.

Figure 11:
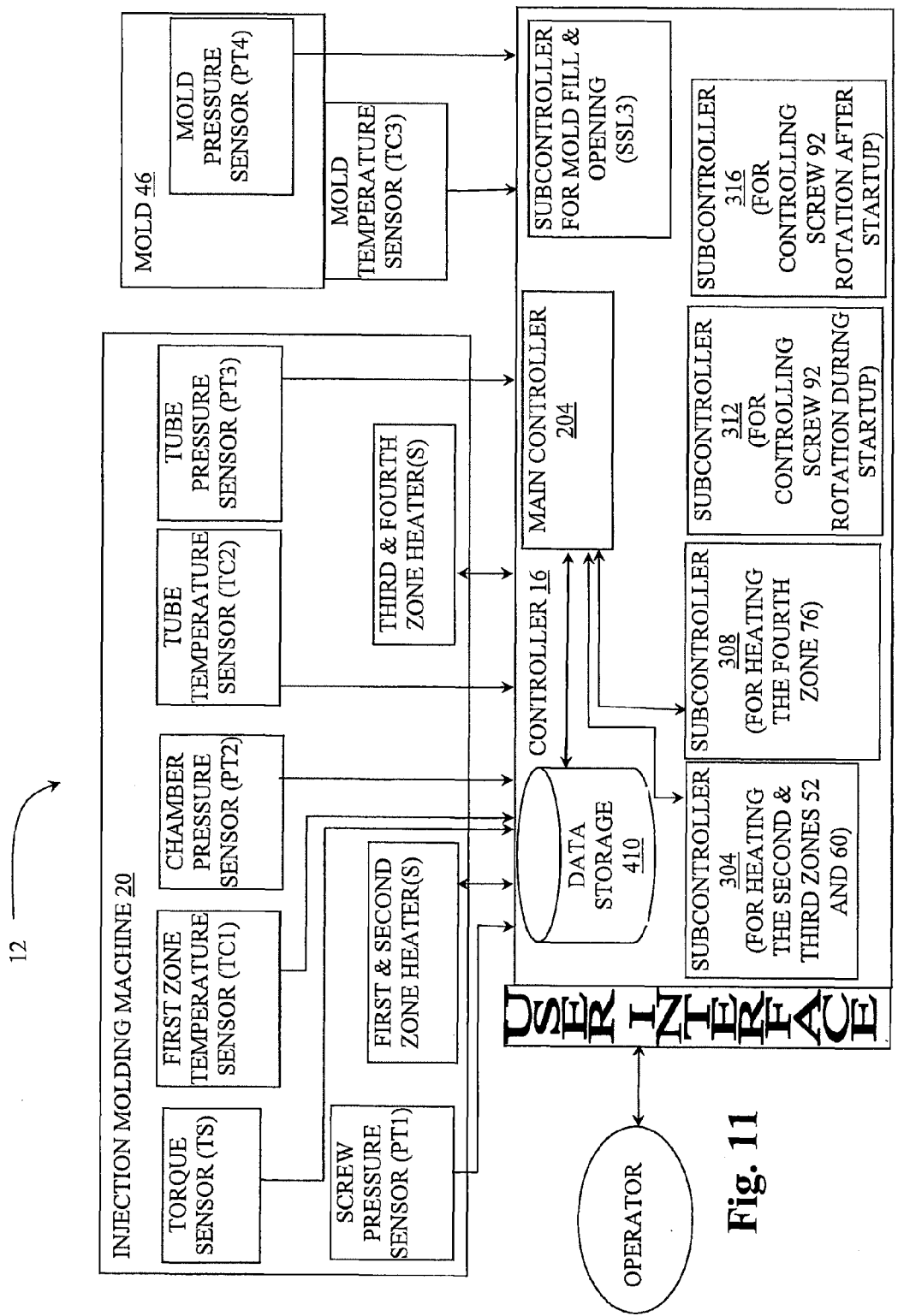
FIG. 11 is a block diagram of the injection molding system 12.

FIG. 11 shows a block diagram of the injection molding system 12, wherein additional detail is provided of the internal components of the controller 16. Referring to the controller 16, it includes a main controller 204 that performs that high level control functionality for controlling the injection molding machine 20. A flowchart of the processing performed by the main controller 204 is presented in FIG. 12 described hereinbelow. The main controller 204 activates a plurality of subcontrollers that may perform their tasks asynchronously from one another. In particular, subcontroller 304 is provided for controlling the heat source(s) 172 for heating the first and second zones 44 and 52. A subcontroller 308 is provided for controlling the heat source(s) 180 for heating the third and fourth zones 60 and 76. A subcontroller 312 is provided for controlling the screw 92 rotation during startup of the injection molding machine 20, and more particularly, prior to injection molding machine entering a plastic processing state where processed plastic is flowing through the injection molding machine appropriately for making parts. A subcontroller 316 is provided for controlling the screw 92 rotation once plastic is flowing through the injection molding machine appropriately for making parts. A description of each of these subcontrollers is provided hereinbelow. However, prior to providing such descriptions, a description of the flowchart of FIG. 12 representing the processing performed by the main controller 204 is provided.

Figure 12:
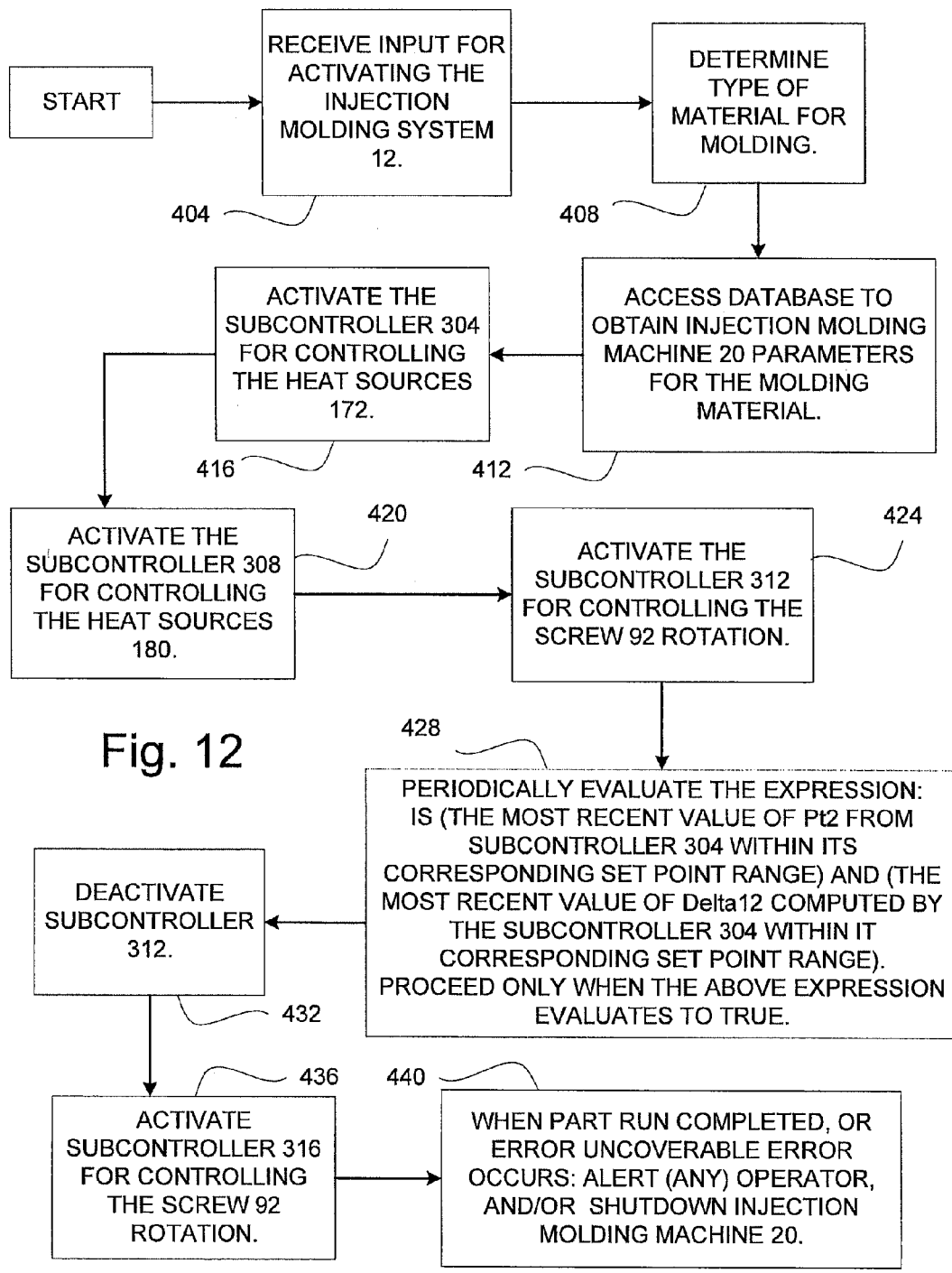
FIG. 12 is a flowchart of the processing performed by the controller 16.

Referring to FIG. 12, in step 404, the controller 16 receives input for activating the injection molding system 12. Such activation may be from an operator at the injection molding system 12, or an operator that is remote from the location of the system 12. Moreover, since the controller 16 can be remote from the injection molding machine 20 (e.g., in communication therewith via a communications network such as the Internet), the operator may reside at the controller site, or at the injection molding machine site. Alternatively/additionally, the operator may not reside at the site for either the controller 16 or the injection molding machine 20, but instead may communicate with controller via a communications network. Moreover, the input received may be from another computational system such as an inventory management system that automatically requests additional parts to be produced by the injection molding system 12.

Note that such input may include a type of material to be supplied to the injection molding machine 20, an identification(s) of the part(s) to be molded, the quantity of parts to be produced.

In step 408 of FIG. 12, the controller identifies from the input received the type of material to supply to the injection molding machine 20. Such identification may be precisely identified in the input, or may be only generally identified (e.g., by a plastics chemical family, or by required part functionality such as elasticity, compression strength, biodegradable, acceptable for retention in a human body, non-toxic if ingested, etc. In one embodiment, such material may be automatically supplied to the hopper 24 for commencing to produce the parts desired, and the desired mold 46 may be automatically attached to the injection molding machine 20, e.g., once the mold is located in an inventory of molds 46. Subsequently, in step 412, a database management system 410 (FIG. 11) may be accessed for determining the injection molding machine 20 parameters to use in molding the desired parts.

In step 416, the subcontroller 304 is activated for controlling the heat source(s) 172 for heating the second and third zones 44 and 52. The input to the subcontroller 304 may include a desired start temperature range for readings from the temperature sensor TC1 as determined for plastic to be processed; the range of temperatures may be, e.g., +/−10 degrees F., and the range may be a set point range identified as the range [set_pt_low, set_pt_hi] wherein set_pt_low is a low set point for the readings from TC1, and set_pt_hi is a high set point for these readings. Psuedo-code representative of the processing performed by the subcontroller 304 is as follows:

Subcontroller 304 processing:

Activate asynchronously (the following processes):
  Process 1:
    At "X" frequency read input temperature measurement from TC1;
    If the input temperature measurements are below "set_pt_low", then
      Make sure the heat sources 172 are activated for heating;
    Else make sure the heat sources 172 are not heating;
  Process 2:
    Repeat every "Y" time interval:
      If (Delta12_Not_Measured) then /* "Delta12_Not_Measured" is
                                set to TRUE after the plunger 160 retracts
                                into the screw 92
                              */
      If (the plunger 160 is fully retracted into the screw 92)
        then {
          Pt1 ← Read PT1;
          Pt2 ← Read PT2;
          Delta12 ← Pt1 − Pt2;
          Delta12_Not_Measured ← FALSE;

| Subcontroller 304 processing: |
|---|
| ```
        If (Delta12 >= its corresponding predetermined set point)
        then {
            /* either plastic viscosity in screw 92 is high, and/or,
            plastic is not flowing through channels 56 into the
            injection chamber 64
            */
            Tc1 ← read TC1;
            If (Tc1 <= set_pt_hi) then
                Override Process 1, and make sure the heat sources
                172 are heating;
        }
Until (subcontroller 304 is deactivated).
``` |

Referring to the subcontroller 304 psuedo-code hereinabove, process 1 and process 2 may be activated for being performed simultaneously. However, note that process 2 can override process 1 to force the heat source(s) 172 to heat zones 44 and 52. It is believed that an important aspect of the controller 16 is the use of the pressure measurements from the sensors PT1 and PT2 to modulate the heat delivered to the first and second zones 44 and 52. In particular, the computation of "Delta12" provides a quantitative index as to whether plastic viscosity in screw 92 is high, and/or the plastic is not flowing through channels 56 into the injection chamber 64. For example, if the value Pt1 is high relative to the value of Pt2, then there is substantial pressure in the first and second zone 44 and 52 for pushing the screw 92 out the rear end of the injection molding machine 20, and little (if any) plastic in the injection chamber 64. Accordingly, this is indicative of the plastic in the second and third zones 52 and 60 not being hot enough to proper flow through the channel 56 and into the injection chamber 64. Thus, in this case, any deactivation of the heat source(s) 172 is overridden by process 2. Note that it may be important for the reading of PT1 and PT2 to be taken substantially simultaneously, and that the readings of PT2 be taken when the pressure in the injection chamber 68 is not being impacted by the movement of the plunger 160 into or out of the injection chamber. Accordingly, such reading are only taken when the controller 16 detects that the plunger is fully retracted from the injection chamber 64. The use of the Boolean variable "Delta12_Not_Measured" assists in making sure the readings are taken at a proper time.

In step 420, the subcontroller 308 is activated for controlling the heat source(s) 180 for heating the fourth zone 76. As described in the pseudo-code following. Note that the input for this subcontroller is: a desired start temperature range for readings from the temperature sensor TC2 (for heat sources 180) for plastic to be processed, the range of temperatures (e.g., +/−10 degrees F.) creating a set point range, i.e., a range: [set_pt_low2, set_pt_hi2] for the readings from TC2.

| Subcontroller 308 processing: |
|---|
| ```
Activate asynchronously (the following processes):
    Process 3:
        At "X" frequency the subcontroller 308 reads input temperature
            measurements from TC2;
        If the input temperature measurements are below "set_pt_low2",
        then
            Make sure the heat sources 180 are activated for heating;
            Else make sure the heat sources 180 are not heating.
    Process 4:
        Repeat every "Y" time interval:
            If (Delta23_Not_Measured) then /* "Delta23_Not_Measured" is
                set to TRUE after the plunger 160 retracts
``` |

| Subcontroller 308 processing: |
|---|
| ```
                into the screw 92
                */
            If (the plunger 160 is fully retracted into the screw 92)
                then {
                    Pt2 ← Read PT2;
                    Pt3 ← Read PT3;
                    Delta23 ← Pt2 − Pt3;
                    Delta23_Not_Measured ← FALSE;
                    If (Delta23 >= its corresponding predetermined set point)
                    then {
                        /* either plastic viscosity in injection chamber 64 is high,
                        and/or, plastic is not flowing through injection tube 78 */
                        Tc2 ← read TC2;
                        If (Tc2 <= set_pt_hi2) then
                            Override Process 3, and make sure the heat sources 180
                            are heating;
                    }
Until (subcontroller 308 is deactivated).
``` |

Note that the variables "Delta23" and "Delta23_Not_Measured" have similar meanings as "Delta12" and "Delta12_Not_Measured" described hereinabove.

Subsequently, step 424 is performed, wherein the subcontroller 312 is activated for controlling the screw 92 rotation. Pseudo-code describing the actions performed by this subcontroller follow.

| Subcontroller 312 processing: |
|---|
| ```
Repeat at predetermined intervals:
    If (the input temperature measurements are in the range
    [set_pt_low, set_pt_hi])
    then
        Make screw 92 is rotating Until (PT1 indicates back pressure exceeds
            maximum pressure allowed) OR (PT2 indicates pressure from
            plastic presence is above a predetermined set point);
        If (PT1 indicates back pressure exceeds maximum pressure) then
            Stop the screw 92 for an elapsed time "X", and PT1 pressure
            readings are monitored at "X" time intervals. When PT1 drops
            below maximum pressure allowed, the screw 92 is rotated;
        If (PT2 indicates pressure from plastic presence is above a
        predetermined minimum set point) then
            The screw 92 is stopped until pressure at PT2 falls below the
            predetermined minimum set point for PT2, and PT2 pressure
            readings are monitored pressure at "X" time intervals. When PT2
            drops below the predetermined minimum set point for PT2, the
            screw 92 is rotated;
Until (subcontroller 312 is deactivated).
``` |

Subsequently, in step 428, the expression: (the most recent value of pt2 by subcontroller 304 is within its corresponding predetermined set point range) AND (the most recent value of Delta12 computed by subcontroller 304 is within a predetermined set point range) is repeatedly evaluated. When this expression evaluates to "TRUE", the subcontroller 312 is deactivated and the subcontroller 316, whose pseudo-code is hereinbelow, is activated.

| Subcontroller 316 processing: |
|---|
| ```
Repeat at predetermined intervals:
    If ((the most recent value of Pt3 indicates a pressure below its minimum
        corresponding predetermined low set point) OR (the most recently
        computed value for Delta23 is outside of its predetermined set
        point range) then
        Make sure screw 92 is rotating;
``` |

| Subcontroller 316 processing: |
|---|
| If (the most recent value of Pt3 indicates pressure exceeds maximum set point pressure) then<br>    Stop the screw 92 for an elapsed time "X", and PT1 pressure readings are monitored at "X" time intervals. When PT1 drops below maximum pressure allowed, commence rotating the screw 92;<br>If (the most recent value of Pt2 indicates pressure is above a predetermined minimum set point) then<br>    The screw 92 is stopped ", and PT2 pressure readings are monitored at "X" time intervals. When PT2 drops below the predetermined minimum set point for PT2, commence rotating the screw 92;<br>Until (subcontroller 316 is deactivated). |

Subsequently, step 440 is performed.

When an appropriate profile is achieved by measurements of the heat source(s) 172 and heat source(s) 180 sequences via their corresponding sensors, we then have a volume of material where the viscosity as measured as resistance to flow, is optimized and known. When this condition is achieved we will have realized a low delta between PT1 and PT2 and furthermore a low delta between PT1 and PT3. This allows the use of the screw 92 to extrude plastic directly into the mold 46 when desired.

In any of the following modes of injection molding, operation of the last key component is PT4 pressure transducer in the injection mold.

The above disclosure lays the foundation for four different injection molding processes: Plastic Injection Molding Method (PIMM) 1 through 4 described hereinbelow.

(a) PIMM1—the Injection Plunger is advanced beyond the truncation of the Lobe Geometry to evacuate the Injection Zone. As the Injection Plunger advances the Nozzle valve is opened to allow flow of plastic into the injection mold causing the mold cavity to fill and plunger travel ceases upon satisfying predetermined pressure set point as indicated by PT4.

(b) PIMM2—Screw Auger rotates continuously to extrude plastic and the Nozzle valve is opened to allow flow of plastic into the injection mold causing the mold cavity to fill to some predetermined percentage through plastic extrusion (low speed, low shear) when the Injection Plunger is then utilized to finish the injection process to the predetermined pressure set point as indicated by PT4 at which time plunger travel ceases.

(c) PIMM3—Screw Auger rotates continuously to extrude plastic and the Nozzle valve is opened to allow flow of plastic into the injection mold causing the mold cavity to fill completely by extrusion (low speed, low shear) to the predetermined pressure set point as indicated by PT4 at which time extrusion ceases.

(d) PIMM4—Screw Auger rotates continuously to extrude plastic and the Nozzle valve is opened to allow flow of plastic into the injection mold causing the mold cavity to begin filling when the Injection Plunger is then utilized to cycle repeatedly until realizing predetermined pressure set point as indicated by PT4 at which time plunger travel ceases.

The foregoing discussion of the injection molding system 12 has been presented for purposes of illustration and description. Further, the description is not intended to limit the invention(s) disclosed herein any to the form disclosed. Consequently, variation and modification commiserate with the above teachings, within the skill and knowledge of the relevant art, are within the scope of the present invention. The embodiment described hereinabove is further intended to explain the best mode presently known of practicing the invention, and to enable others skilled in the art to utilize each invention herein, or in other embodiments thereof, and as may be provided with the various modifications required by their particular application or uses of the invention(s) herein.

I claim:

1. A machine for injection molding comprising:
    a barrel having an interior and having a longitudinal axis;
    a screw auger positioned within the barrel interior, wherein the screw auger is substantially concentric with the barrel and is operable to rotate and transmit a material along the length of the barrel, wherein the screw auger includes a bore also substantially aligned with the longitudinal axis;
    a heating element in thermal communication with said barrel;
    an injection chamber;
    a channel, wherein the channel provides fluid communication between the injection chamber and the barrel;
    a plunger substantially aligned for movement along the longitudinal axis and with the bore and being substantially coaxial with said screw auger, wherein said plunger rotates with the rotation of the screw auger;
    an injection tube wherein the injection tube is in fluid communication with the injection chamber, and wherein the injection tube is located adjacent the plunger; and
    a temperature sensor in communication with one of the barrel, the injection chamber, and the injection tube;
    a coolant reservoir in communication with one of the barrel, the injection chamber, and the injection tube, provided to prevent excessive heat from the plastication of pellets from being transferred to a throat block;
    wherein rotation of the screw auger is dependent on a first pressure reading obtained from a first pressure sensor and a second reading of a second pressure sensor, wherein the first reading is indicative of a force applied to the screw auger in a direction that is substantially along the longitudinal axis, and wherein the second reading is indicative of a pressure of the material when heated to at least a flowable state;
    wherein a barrier is formed by the compaction of pellets within said barrel as said pellets travel toward a melting zone, said barrier preventing melting plastic from flowing backward in said machine, said machine being devoid of a valve that prevents substantial flowback of melted plastic.

2. The machine as set forth in claim 1, wherein the plunger in a first position impedes fluid communication between the barrel and the injection chamber.

3. The machine as set forth in claim 1, wherein the plunger in a second position does not impede fluid communication between the barrel and the injection chamber.

* * * * *